United States Patent
Van Eden et al.

(10) Patent No.: US 6,478,355 B1
(45) Date of Patent: Nov. 12, 2002

(54) ADAPTABLE PICK UP TRUCK CONFIGURATION

(75) Inventors: Leon F. Van Eden, Troy, MI (US); Robert M. Hunt, Bingham Farms, MI (US); Robert Gordon Storc, Rochester Hills, MI (US); Rajiv K. Gupta, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/237,337

(22) Filed: Jan. 26, 1999

Related U.S. Application Data

(60) Provisional application No. 60/075,827, filed on Feb. 24, 1998.

(51) Int. Cl.$^7$ ................................................ B62D 25/00
(52) U.S. Cl. ..................... 296/37.6; 296/183; 296/39.2; 296/146.2
(58) Field of Search .............................. 296/37.6, 39.2, 296/146.2, 26.11, 146.8, 183

(56) References Cited

U.S. PATENT DOCUMENTS

| | | | |
|---|---|---|---|
| 2,184,814 A | 12/1939 | Nagamatsu | 24/116 |
| 2,534,626 A | 12/1950 | Rubenstein | 296/57 |
| 2,602,691 A | 7/1952 | Doty | 296/66 |
| 3,169,792 A | 2/1965 | Viquez | 296/99 |
| 3,240,527 A | 3/1966 | Weiss et al. | 296/24 |
| 3,291,520 A | 12/1966 | Smith | 296/24 |
| 3,729,224 A | 4/1973 | Hathaway, Jr. | 296/23 |
| 3,770,312 A | 11/1973 | Shadburn | 296/28 |
| 4,093,301 A | 6/1978 | Kwok | 296/23 |
| 4,135,761 A * | 1/1979 | Ward | 296/37.6 |
| 4,315,653 A | 2/1982 | Sparling | 296/29 |
| 4,458,939 A | 7/1984 | Hohn | 296/164 |
| 4,480,868 A | 11/1984 | Koto | 296/190 |
| 4,671,013 A * | 6/1987 | Friese et al. | 296/146.2 X |
| 4,705,317 A * | 11/1987 | Henri | 296/37.6 |
| 4,848,832 A | 7/1989 | Starnes | 296/166 |
| 4,909,558 A * | 3/1990 | Roshinsky | 296/39.2 |
| 4,941,702 A | 7/1990 | Southward | 296/37.6 |
| 5,110,171 A * | 5/1992 | Anthony | 296/39.2 |
| 5,150,939 A | 9/1992 | Simin | 296/37.1 |
| 5,240,301 A | 8/1993 | Arnold | 296/39.2 |
| 5,415,506 A | 5/1995 | Payne | 410/129 |
| 5,449,212 A | 9/1995 | Seifert | 296/57.1 |
| 5,524,951 A * | 6/1996 | Johnson | 296/37.6 |
| 5,685,593 A * | 11/1997 | O'Connor | 296/39.2 |
| 5,845,952 A * | 12/1998 | Albertini et al. | 296/37.6 |
| 5,934,727 A * | 8/1999 | Storc et al. | 296/26.11 |

FOREIGN PATENT DOCUMENTS

| | | | |
|---|---|---|---|
| DE | 1092316 | 11/1960 | |
| JP | S46-1922 | 1/1971 | |
| JP | 363141823 | * 6/1988 | 296/146.8 |

OTHER PUBLICATIONS

"Chevrolet sees SUV pickup as core product", Joe Miller, Automotive News, Jan. 3, 2000, p. 6.

* cited by examiner

Primary Examiner—Joseph D. Pape
(74) Attorney, Agent, or Firm—Laura C. Hargitt

(57) ABSTRACT

A pick up truck configuration is adaptable for carrying a cargo load longer than the cargo box and preferably at or above the wheel covers protruding into the cargo box. An adaptable pick up truck configuration includes a cab portion and a cargo box. A box panel portion is pivotally connected to a front wall of the cargo box and is movable to a generally horizontal position in which the box panel portion partially overlies and is supported by the wheel covers. The cargo box includes a cargo box opening when the box panel portion is in the generally horizontal position. A cab panel portion is pivotally mounted to the cab portion and is movable between a generally vertical closed condition and a generally horizontal open position. The cab portion has a cab opening when the cab panel portion is in the generally horizontal position and the cab opening is at least partially aligned with the cargo box opening. Thus, the pick up truck configuration is adaptable to carry the cargo load longer than the cargo box through both the cab portion and the cargo box and also advantageously can carry a wider load above the wheel covers.

19 Claims, 13 Drawing Sheets

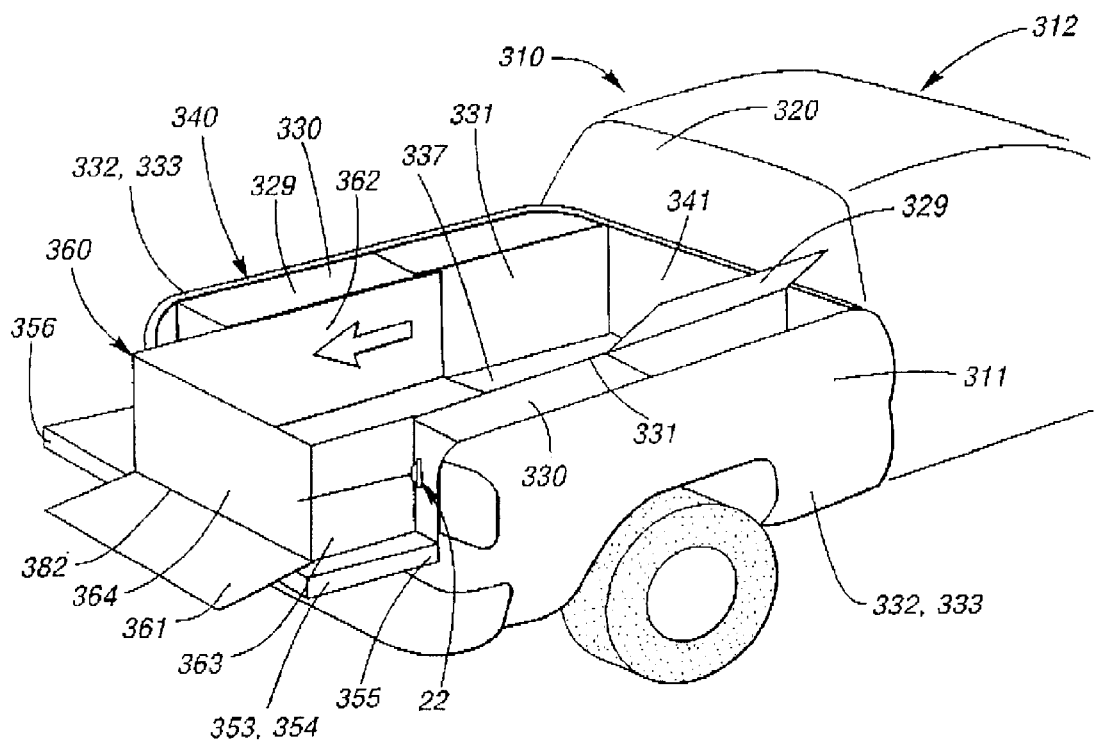
FIG. 21
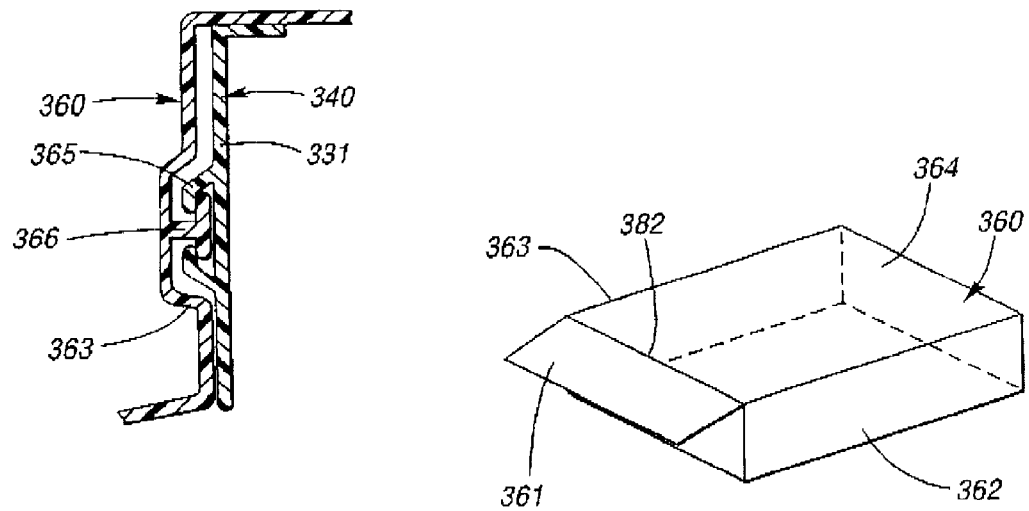
FIG. 22
FIG. 23

ADAPTABLE PICK UP TRUCK CONFIGURATION

This application claims priority from Provisional Application Serial No. 60/075,827 filed Feb. 24, 1998.

TECHNICAL FIELD

This invention relates to a pick up truck having an adaptable configuration which alternately permits increased cargo space and increased passenger space.

BACKGROUND OF THE INVENTION

It is well known in the prior art to provide a pick up truck having a cab portion for carrying passengers and a cargo box for carrying cargo. The cargo box typically includes wheel covers which decrease the available width of the cargo box at the lower portion of the box. It is also known in the prior art that wider loads may be carried in the cargo box by providing one or more planar members, such as boards, which assist in carrying a wider load above the wheel covers in the cargo box.

It is also known in the prior art to provide aligned holes or passages in both the cab portion and the cargo box for carrying a somewhat longer load on the floor of the truck. However, this arrangement has the shortcoming of requiring the load to be placed directly in the passenger compartment, so that increased capacity for messy loads, such as dirt or gravel, is not practical. In addition, these configurations are not well-adapted for carrying passengers when not in use for carrying cargo. Other passages or openings have been provided between cab portions and cargo boxes, however, these configurations are concerned with the passing through or seating of passengers and are not suited for carrying increased cargo loads.

It is also known in the prior art to provide a cargo box including a front wall adjacent the cab portion and a rear wall. The pick up truck configuration is adaptable for carrying a cargo load longer than the cargo box and at or above the wheel covers protruding into the cargo box. A box panel portion is pivotally connected to the front wall of the cargo box and is movable between a generally vertical position in which the front wall of the cargo box is closed and a generally horizontal position in which the box panel portion partially overlies and is supported by the wheel covers. The cargo box includes a cargo box opening when the box panel portion is in the generally horizontal position. A cab panel portion is pivotally mounted to the cab portion and is movable between a generally vertical closed condition and a generally horizontal open position. The cab portion has a cab opening when the cab panel portion is in the generally horizontal position and the cab opening is at least partially aligned with the cargo box opening. Thus the pick up truck configuration is adaptable to carry the cargo load longer than the cargo box through both the cab portion and the cargo box and also can carry a wider load at or above the wheel covers. However, this arrangement has the shortcomings of requiring two panels, one on the cab portion and one on the cargo box which must be reconfigured. In addition, the cab portion is not isolated from the outside ambient elements. Furthermore, loose loads such as gravel cannot be kept separate from the cab portion.

As the popularity of trucks increases, it has become desirable to provide trucks that have rearward extended cab portions suitable for carrying more than three passengers. However, this reduces the load carrying capacity of the cargo boxes.

SUMMARY OF THE INVENTION

The present invention provides alternatives and advantages over the prior art by providing an adaptable pick up truck configuration which allows for carrying increased loads over the traditional pick up configurations. These arrangements are particularly useful for better versatility and utility of pick up trucks with expanded rear seat passenger compartments and shorter cargo boxes. Advantageously, these pick up truck configurations can alternately be used for carrying both front and rear seat passengers while also being adaptable to carry longer cargo loads while, in certain embodiments, protecting the vehicle interior from damage or dirt from the cargo load. Also advantageously, the increased load carrying capabilities of the pick up truck do not interfere with the provision of a fully functional cab portion for carrying both front and rear seat passengers. Advantageously, the pick up truck is easily adaptable for carrying passengers or for carrying increased cargo loads. Also, the pick up truck can be used as a traditional pick up truck with full passenger capacity and traditional load carrying capacity, when desired. Advantageously, the reconfiguration of the truck for expanded load carrying capacity is easily accomplished, preferably without the use of any tools. Certain embodiments of the invention also include sealed separation of the passenger compartment from the increased cargo space and features for covering the cargo load and preventing the cab interior from being exposed to outside ambient conditions. This arrangement also advantageously allows the use of a shorter cargo box for easier parking and maneuvering, while providing a truck for carrying more than three passengers or expanded cargo loads.

BRIEF DESCRIPTION OF THE DRAWINGS

FIG. 3b is an enlarged sectional view as indicated generally at 3b in FIG. 3a;

FIG. 21 is a rear perspective view of still another alternate embodiment of the pick up truck including a sliding liner portion in a rearward position for increased cargo capacity;

FIG. 22 is an enlarged sectional view as indicated generally at area 22 in FIG. 21 and showing a sliding mechanism of the sliding liner portion;

FIG. 23 is a rear perspective view of the sliding liner portion of FIG. 21 being removed from the truck and overturned for alternate use as a tonneau cover;

DESCRIPTION OF THE PREFERRED EMBODIMENT

Figure 1:
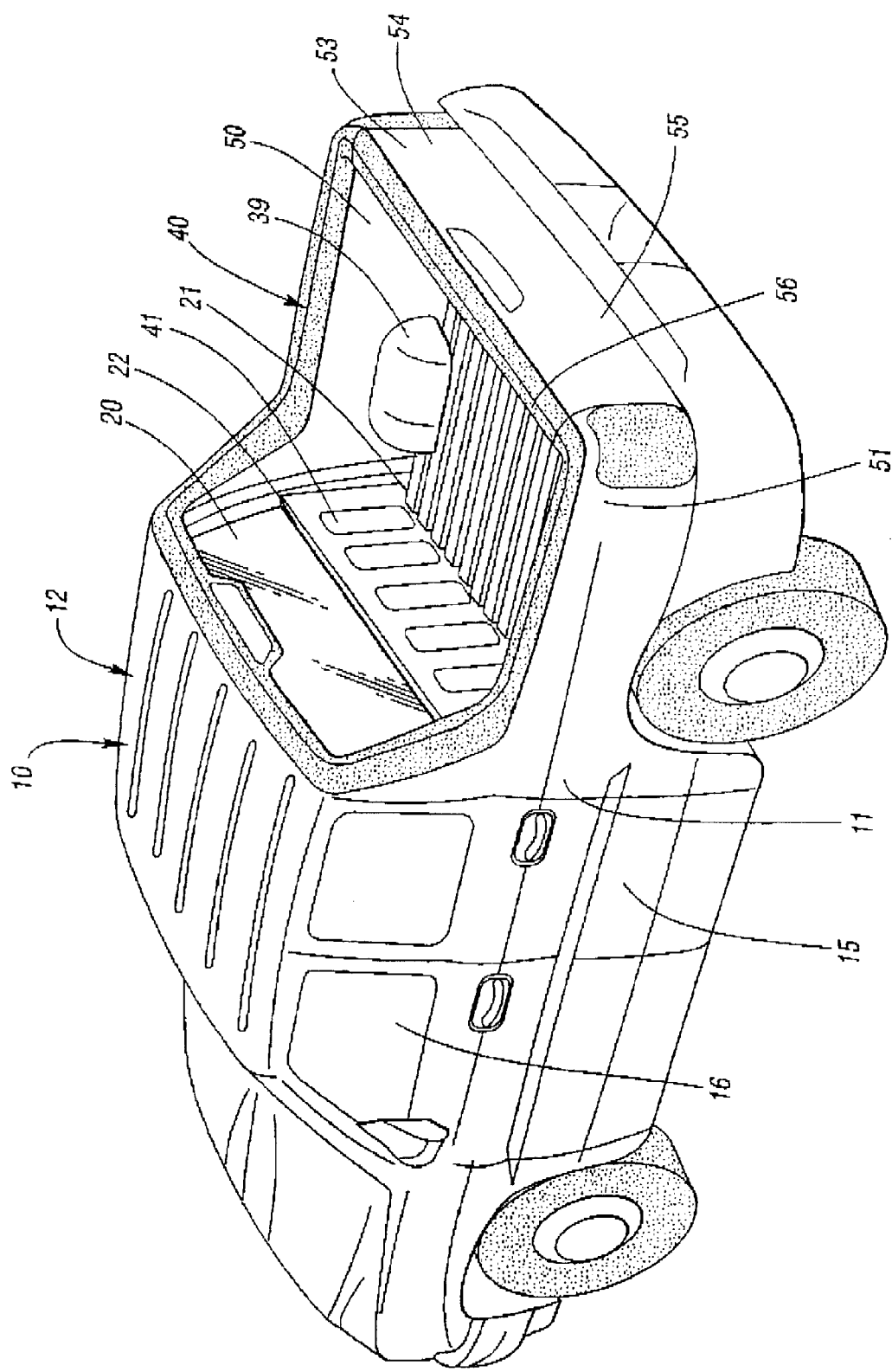
FIG. 1 is a rear perspective view of a pick up truck in a normal condition for carrying passengers in a cab portion.
Figure 2:
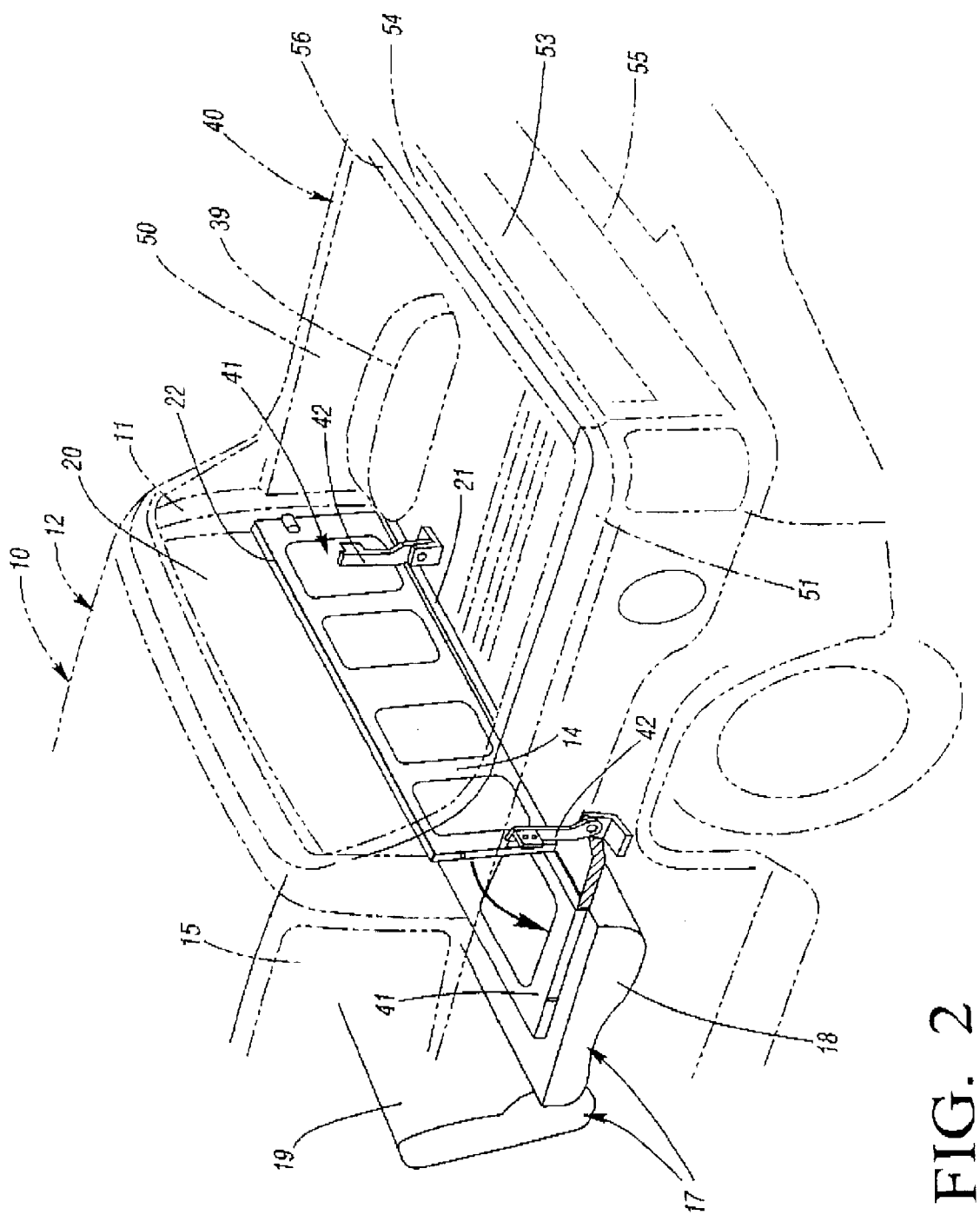
FIG. 2 is a view similar to FIG. 1, but showing the pick up truck reconfigured to an expanded load carrying condition.

Referring to FIGS. 1 and 2, a vehicle being a pick up truck 10 includes a cab portion 12 for normally carrying passengers and a cargo box 40 for carrying various types of cargo loads (not shown), for example such as wooden boards each having a length of six to ten feet or a multitude of other cargo loads. As best shown in FIG. 1, the truck 10 includes a front passenger seating area, generally indicated at 16, having one or more front seats for seating one to three passengers. As is becoming increasingly popular, the cab portion 12 also includes a rear extended cab portion 15 which preferably includes a rear seat 17 for seating an additional one to three passengers. The truck 10 includes features making it easily adaptable for carrying longer loads without lengthening the cargo box 40 for ease of parking and maneuvering, while also permitting the increased passenger capacity, as described further hereinafter.

The cargo box 40 generally includes four sides comprising a front divider panel portion 41, first and second side walls 50, 51 and a rear wall 53 mainly provided by a tailgate 54. The tailgate 54 is pivotally mounted at a lower tailgate edge 55 adjacent to the side walls 50, 51 for movement between a generally horizontal open condition and a generally vertical closed condition, as shown in FIGS. 1 and 2. The tailgate 54 also includes an upper tailgate edge 56. The cargo box 40 includes a lower floor portion 37 extending between the panel portion 41, and walls 50, 51, and 53. The cargo box 40 further includes upwardly extending wheel covers 39 which protrude into the cargo box 40 and decrease the width of the cargo box 40 at the floor portion 37.

Referring to FIG. 2, the rear extended cab portion 15 includes the rear seat 17, which is preferably shown as a single bench seat, but may also be one or more separate seats. The rear seat 17 includes an upper seat back 18 which is pivotally mounted at its lower edge and a seat bottom 19 which is pivotally mounted at its forward edge. The rear seat 17 is normally configured for seating one to three passengers in the rear seat 17 for maximum passenger carrying capacity. The rear seat 17 may also be reconfigured for maximum cargo load capacity, as described further hereinafter and as shown in FIG. 2.

As shown in FIG. 1, the divider panel portion 41 is normally oriented in a generally vertical position and preferably provides a single structural dividing wall between the cargo box 40 and the cab portion 12 and simultaneously serves as the front wall of the cargo box 40 and the rear wall of the cab portion 12. The panel portion 41 normally separates and closes the cab portion 12 and its passengers from the ambient surroundings outside. The panel portion 41 is hinged to the truck body 11 for pivoting about a lower panel edge 21 from a generally vertical closed condition to a generally horizontal open condition as shown in FIG. 2. For example, the panel portion 41 may be hingedly connected to the floor portion 37 of the cargo box 40 by suitable hinges 42. The panel portion 41 may be made of any suitable sturdy material, such as metal or composites and preferably is sealed to the body 11 of the truck 10 around its outer panel edges when in the generally vertical closed condition.

A glass rear window 20 is normally positioned above the panel portion 41 and vertically aligned therewith for further closing the cab portion 12 from the outside surroundings. As best shown in FIG. 2, the rear window 20 can advantageously be rolled downward into the panel portion 41 by various amounts for allowing air flow into the cab portion 12. Also advantageously, the rear window 20 can be completely dropped into the panel portion 41 such that the glass rear window 20 is protected when the pick up truck 10 is reconfigured to the maximum load carrying condition, as will now be described.

As shown in FIG. 2, the truck 10 can easily be reconfigured from the maximum passenger carrying capacity shown in FIG. 1 to the maximum cargo carrying capacity shown in FIG. 2, without the use of tools. Referring to FIG. 2, the rear window 20 is preferably first dropped or rolled down completely into the panel portion 41. Next, the rear seat bottom 19 is pivoted forward and upward about its forward edge to a generally vertical position. Then, the rear seat back 18 is pivoted forward and downward about its lower edge to a generally flat horizontal condition as shown in FIG. 2. The divider panel portion 41 may then be pivoted forward and downward to the generally horizontal open condition as indicated by the arrow in FIG. 2. When the panel portion 41 is in the open condition, an open passage 14 is formed between the cargo box 40 and the cab portion 12. Thus cargo loads of a longer length can be carried which extend from the cargo box 40 and into the extended rear cab portion 15 for maximum load carrying capacity.

Figure 3A:
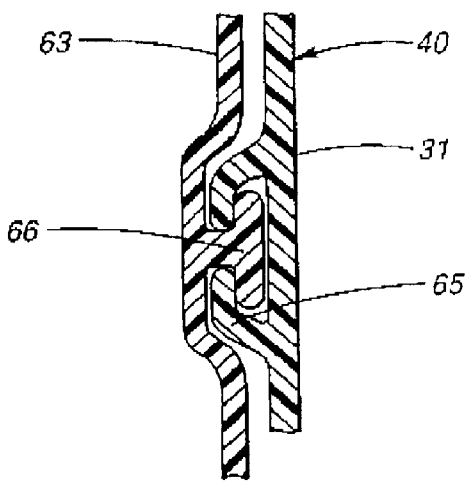
FIG. 3a is a view similar to FIG. 2, but showing the pick up truck reconfigured to an expanded load carrying condition which includes a sliding liner portion separating the increased cargo load from the passenger compartment.
Figure 3B:
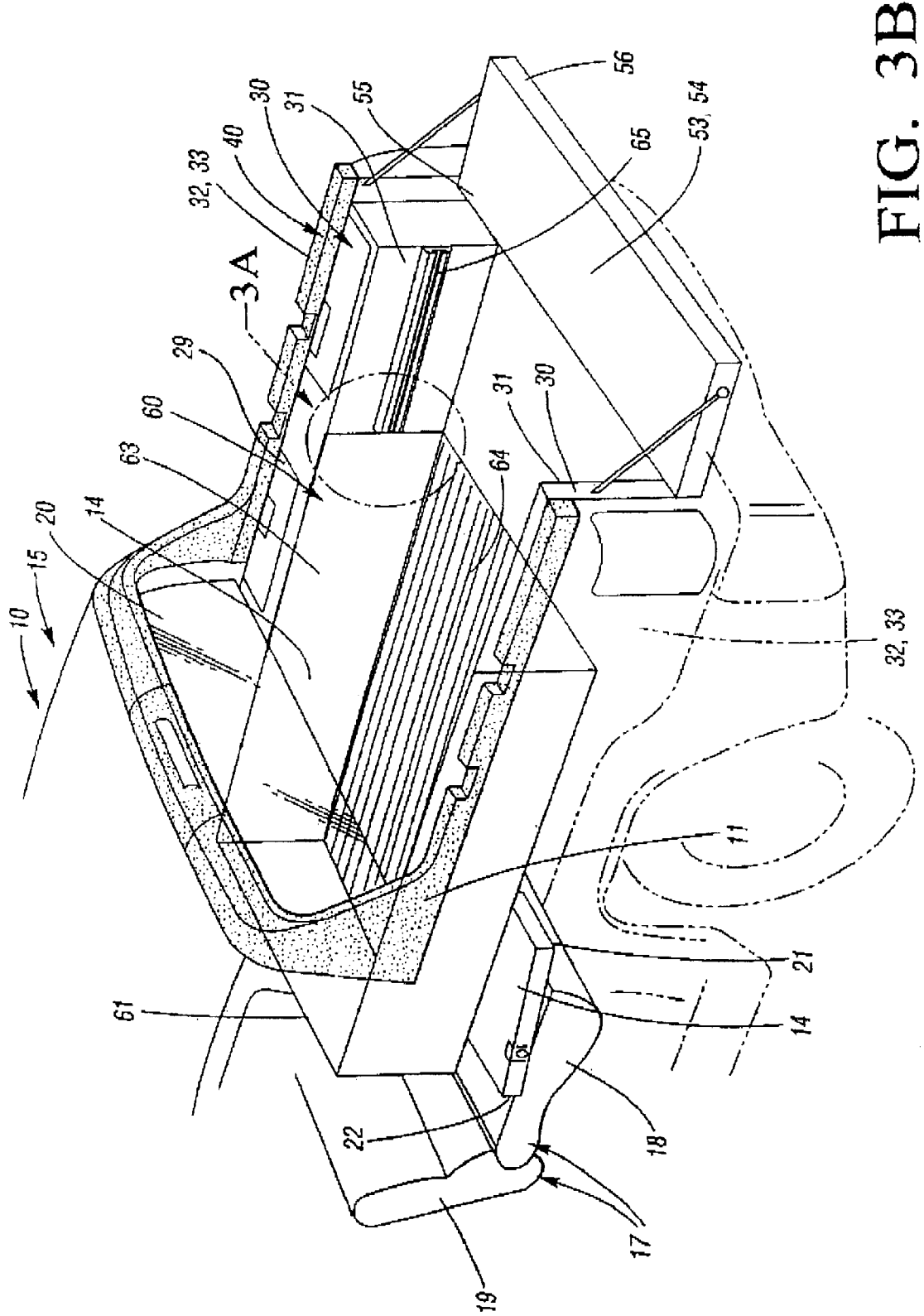

FIGS. 3A and 3B shows an alternate embodiment of the pick up truck configuration of FIGS. 1 and 2 with additional features added. The truck 10 of FIGS. 3A and 3B has the same description using the same numerals for the portions previously described in FIGS. 1 and 2. However, the truck 10 as best shown in FIG. 3B additionally includes a sliding cargo liner portion 60 and side storage compartments 30, as will now be described.

Referring to FIG. 3B, the cargo box 40 includes side storage compartments 30 located on each side of the cargo box 40. The side storage compartments 40 each have an inner wall 31 which preferably covers the wheel covers 39 and also an outer wall 32 which preferably is provided by the outer body sheet metal 33. The side storage compartments 30 also each preferably include hinged cover doors 29 which preferably may be latched and locked for secure storage of smaller cargo items. Although the side storage compartments 30 are shown as top opening, it will be appreciated that many other configurations are possible, including inner and outer openings. Advantageously, the side storage compartments 30 eliminate the empty area between the main cargo box 40 and the sliding cargo liner portion 60 to prevent dirt and moisture from settling in the empty area, if left open.

The truck 10 also includes the cargo liner portion 60 which preferably includes a front liner wall 61 and opposite side liner walls 62, 63 which are connected by a liner floor portion 64. The liner portion 60 is preferably made of a light, yet sturdy material, such as a lightweight metal, plastics, or composites. The liner portion 60 is slidably mounted onto the cargo box 40 at the inner walls 31 forming the storage compartments 30. The liner portion 60 may be slidably mounted to the cargo box 40 in any suitable manner. For example as shown in FIG. 3A, the cargo box 40 may include an integrally molded channel portion 65 extending along the length of the inner walls 31 of the side storage compartments 30 and the liner portion 60 may include a T-shaped guide rail 66 on the outer surfaces of the side liner walls 62, 63 on which the cargo liner portion 60 slides back and forth within the channel portions 65. It will also be appreciated that numerous other sliding configurations are possible, such as exchanging the guide rail 66 and the channel portion 65, or including rollers or chains or cables.

The truck 10 can easily be reconfigured from the maximum passenger carrying capacity shown generally in FIG. 1 to the maximum cargo carrying capacity shown in FIGS. 3A and 3B, without the use of tools. Referring to FIG. 3B, the rear window 20 is rolled down completely into the panel portion 41. Next, the rear seat bottom 19 is pivoted forward and upward about its forward edge to a generally vertical position. Then, the rear seat back 18 is pivoted forward and downward about its lower edge to a generally flat horizontal condition as shown in FIG. 3B. The divider panel portion 41 may then be pivoted forward and downward to the generally horizontal open condition shown in FIG. 3B. When the panel portion 41 is in the open condition, an open passage 14 is formed between the cargo box 40 and the cab portion 12. Next, the cargo liner portion 60 can be slid forwardly into the extended rear cab portion 15 as a single unit. It will be appreciated that the front and side liner walls 61, 62, 63 and the liner floor portion 64 move as a single unit. Preferably, the cargo liner portion 60 is light enough such that it may be pulled or pushed manually forward, such as by handles (not shown). However, it will also be appreciated that power operation could be provided to move the cargo liner portion 60 in the forward and rearward directions.

It will be appreciated that in the maximum load carrying condition shown in FIG. 3B, the cargo liner portion 60 is not covered and a direct air passage is formed between the cab portion 12 and the cargo box 40, such that the cab portion 12 is partially open to the ambient outside surroundings when the truck 10 is reconfigured to the maximum load carrying condition. Advantageously, the sliding cargo liner portion 60 enables loose cargo loads, such as gravel, to be carried using the maximum extended cargo capacity, without damaging the interior of the cab portion 12.

Figure 4:
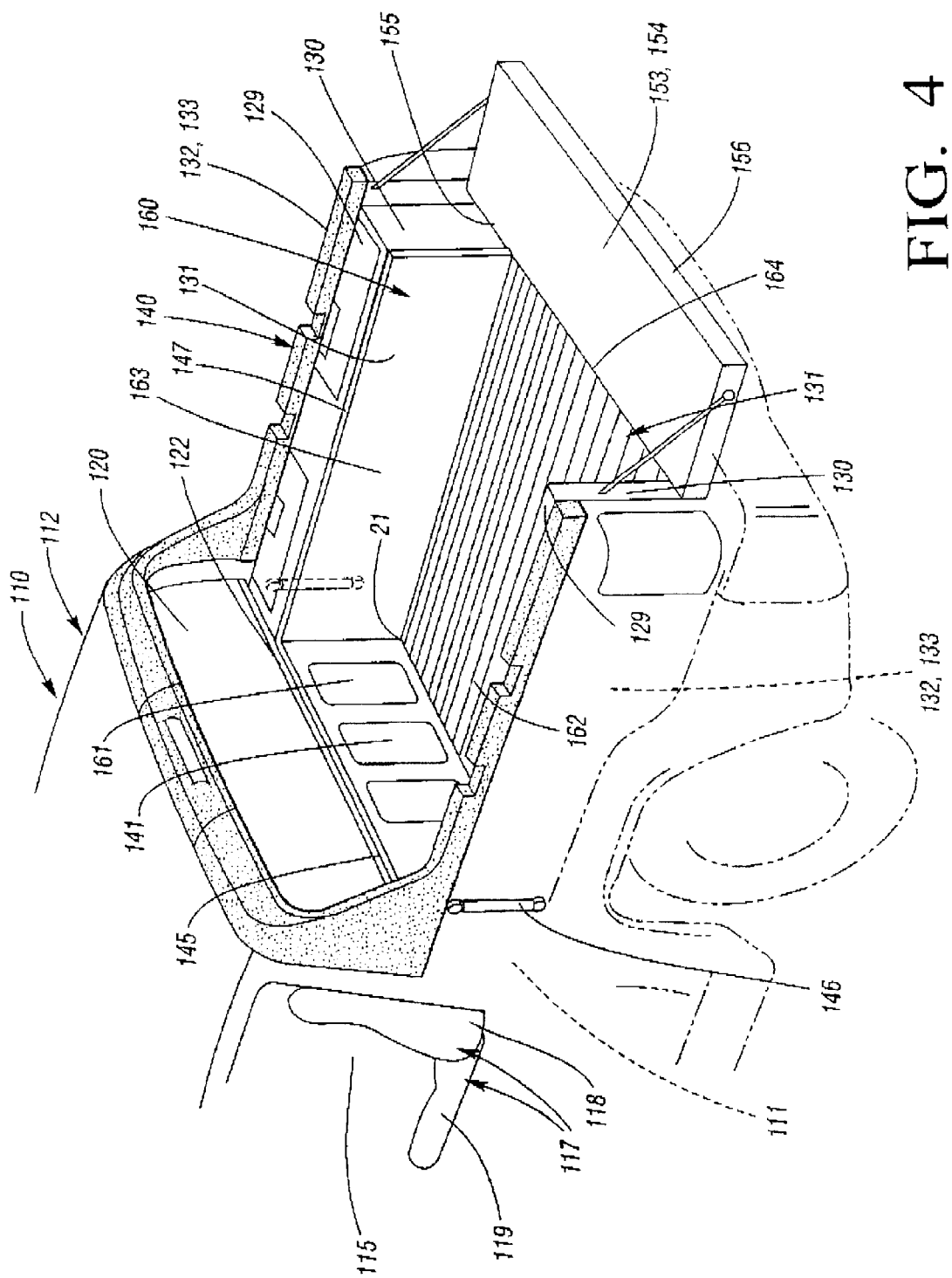
FIG. 4 is a rear perspective view of an alternate embodiment of a pick up truck in a normal condition for carrying passengers in a cab portion.
Figure 5:
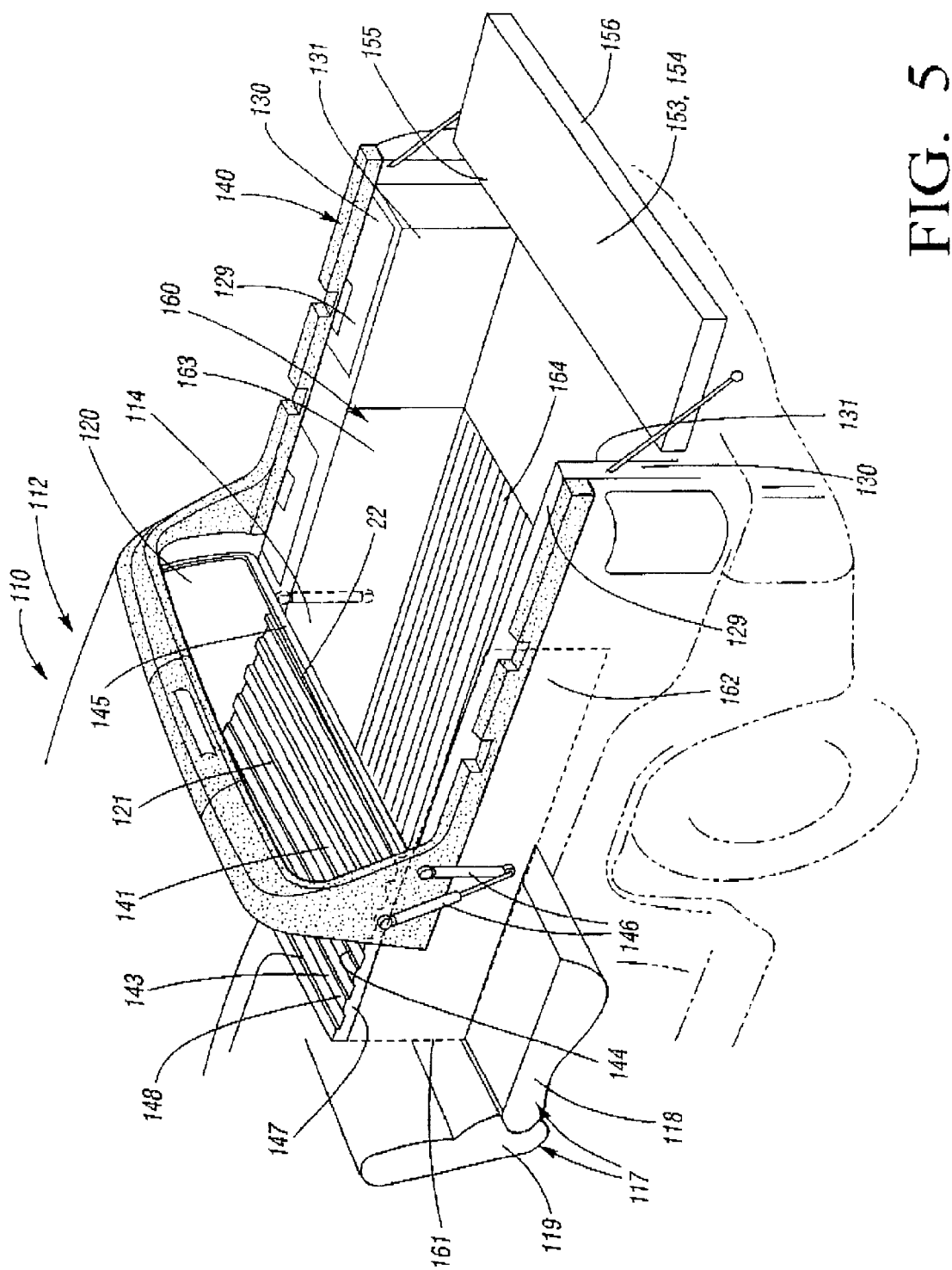
FIG. 5 is a view similar to FIG. 4, but showing the pick up truck reconfigured to an expanded load carrying condition including a sliding liner portion including a divider panel portion that provides a cover for the box portion.

FIGS. 4–7 show another alternate embodiment of the adaptable pick up truck configuration in which the cab portion 112 is advantageously protected from the outside ambient surroundings in the maximum load carrying condition, without the loss of any load carrying capacity over the configurations in FIGS. 1–3. Features having a similar description to those in FIGS. 1–3 are denoted by similar numerals plus 100. A vehicle being a pick up truck 110 includes a cab portion 112 for normally carrying passengers and a cargo box 140 for carrying various types of cargo loads, such as wood or gravel. The truck 110 includes a front passenger seating area (not shown) having one or more front seats. As shown in FIGS. 4 and 5, the cab portion 112 also includes a rear extended cab portion 115 which preferably includes a rear seat 117 for seating an additional one to three passengers. The truck 110 includes features making it easily adaptable for carrying longer loads without lengthening the overall cargo box 140 for ease of parking and maneuvering, while also permitting the increased passenger capacity, as described further hereinafter.

The cargo box 140 generally includes four sides comprising a front divider panel portion 141, first and second inner walls 131 and a rear wall 153 mainly provided by a tailgate 154. The tailgate 154 is pivotally mounted at a lower tailgate edge 155 adjacent to the side walls 150, 151 for movement between a generally horizontal open condition and a generally vertical closed condition. The tailgate 154 also includes an upper tailgate edge 156. The cargo box 140 includes a lower floor portion 137 extending between the panel portion 141, and walls 131, 153. The truck 110 further includes upwardly extending wheel covers (not shown) which protrude into the cargo box 140 and decrease the width of the cargo box 140 at the floor portion 137 to the depth of the inner walls 131.

Figure 6:
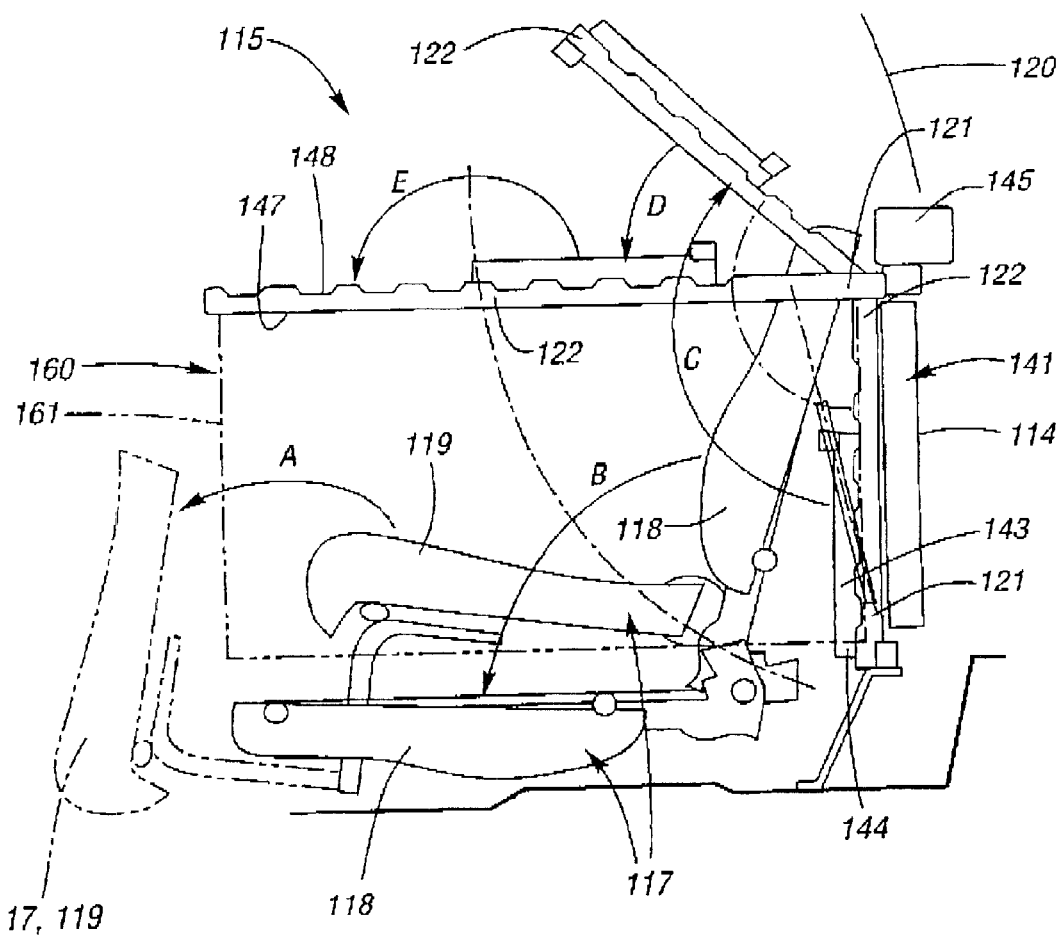
FIG. 6 is a side sectional schematic view of the rear seat area of FIGS. 4 and 5 and showing the reconfiguration from the maximum passenger carrying condition to the expanded load carrying condition.

As best shown in FIGS. 4 and 5, the rear extended cab portion 115 includes the rear seat 117, which is preferably shown as a single bench seat, but may also be one or more separate seats. As best shown in FIG. 6, the rear seat 117 includes an upper seat back 118 which is pivotally mounted at its lower edge and a seat bottom 119 which is pivotally mounted at its forward edge. The rear seat 117 may normally be configured for seating one to three passengers in the rear seat 117 for maximum passenger carrying capacity as shown in FIGS. 4 and 6. The rear seat 117 may also be reconfigured for maximum cargo load capacity, as described further hereinafter and as shown in FIGS. 5 and 6.

As shown in FIG. 4, the main divider panel portion 141 is normally oriented in a generally vertical position and preferably provides a single structural dividing wall between the cargo box 140 and the cab portion 112 and simultaneously serves as the front wall of the cargo box 140 and the rear wall of the cab portion 112. The panel portion 141 normally separates and closes the cab portion 112 and its passengers from the ambient surroundings outside. The panel portion 141 is hinged to the truck body 111 for pivoting about an upper panel edge 121 from a generally vertical closed condition shown in FIG. 4 to a generally horizontal open condition as shown in FIG. 5.

Figure 7:
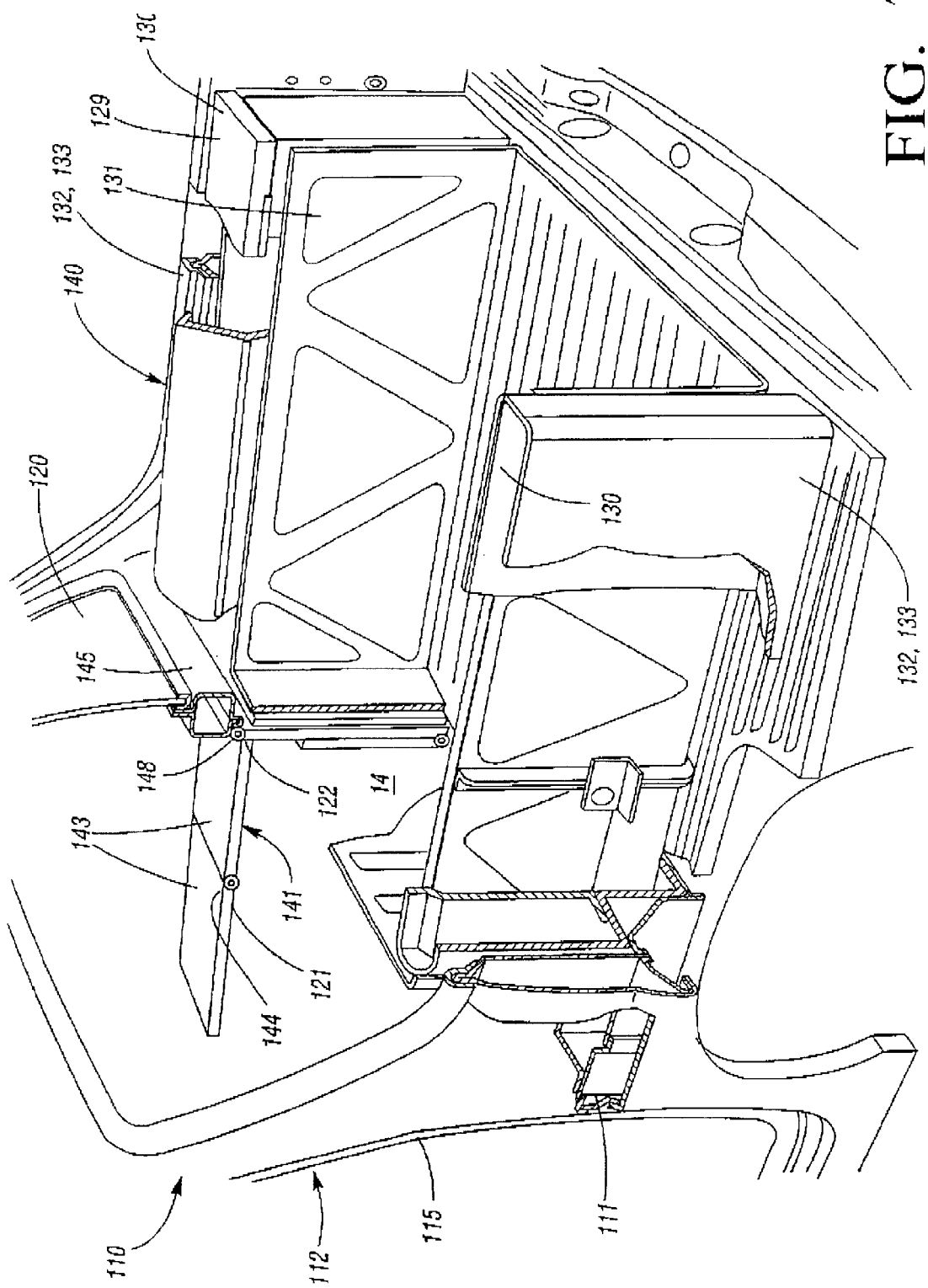
FIG. 7 is another rear perspective view of the pick up truck of FIG. 4 and showing portions of the pick up truck partially broken away and showing a partial side view of the divider panel portion.

As best shown in FIGS. 5, 6 and 7, the panel portion 141 includes an ancillary panel portion 143 which is pivotally connected to the main panel portion 141. For example, a lower ancillary edge 144 of the ancillary panel portion 143 is pivotally connected to the lower panel edge 21 of the main panel portion 141. The panel portion 141 and the ancillary panel portion 143 cooperatively provide a protective cover when the truck 110 is reconfigured for the maximum load carrying capacity, as described further hereinafter. The panel portion 141 and ancillary panel portion 143 may be made of any suitable sturdy material, such as metal or composites.

A glass rear window 120 is normally positioned above the panel portion 141 and vertically aligned therewith for further closing the cab portion 112 from the outside surroundings. The rear window 120 in this configuration preferably cannot be dropped into the panel portion 141. As best shown in FIG. 7, a window support rail 145 supports the rear window 120 and divides the rear window 120 from the panel portion 141. Although not shown, it will be appreciated that the rear window 120 could be openable by having portions that slide back and forth along the window support rail 145. However, it will be appreciated that in this configuration, the rear window 120 somewhat limits the height of the maximum cargo load.

The cargo box 140 preferably includes side storage compartments 130 located on opposite sides of the cargo box 140. The side storage compartments 130 are formed by the inner walls 131 which preferably cover the wheel covers and also outer walls 132 which preferably are provided by the outer body sheet metal 133. The side storage compartments 130 also each preferably include upper hinged cover doors 129 which may be latched and locked for secure storage of smaller cargo items. Although the side storage compartments 130 are shown as top opening, it will be appreciated that many other configurations are possible, including inner and outer openings. Advantageously, the side storage compartments 130 eliminate the empty area between the main cargo box 140 and the sliding cargo liner portion 160 to prevent dirt and moisture from settling in that empty area, if left open.

The truck 110 also includes the cargo liner portion 160 which preferably includes a front liner wall 161 and opposite side liner walls 162, 163 which are connected by a liner floor portion 164. The liner portion 160 is preferably made of a light, yet sturdy material, such as a lightweight metal, plastics, or composites.

The truck 110 can easily be reconfigured from the maximum passenger carrying capacity shown in FIG. 4 to the maximum cargo carrying capacity shown in FIG. 5, without the use of tools. Referring to FIG. 6, the rear seat bottom 119 is pivoted forward and upward about its forward edge to a generally vertical position as indicated by arrow A. Then, the rear seat back 118 is pivoted forward and downward about its lower edge to a generally flat horizontal condition as indicated by arrow B. The main divider panel portion 141 together with the folded ancillary panel portion 143 may then be pivoted upward past the horizontal position as indicated by arrow C. When the panel portion 141 is in the open condition, an open passage 114 is formed between the cargo box 140 and the cab portion 112. Next, the cargo liner portion 160 can be slid forwardly into the extended rear cab portion 115 as a single unit as enabled by the panel portions 141, 143 being pivoted upward above the sliding cargo liner portion 160. It will be appreciated that the front and side liner walls 161, 162, 163 and the liner floor portion 164 move as a single unit. Preferably, the cargo liner portion 160 is light enough such that it may be pulled or pushed manually forward, such as by handles (not shown). However, it will also be appreciated that power operation could be provided to move the cargo liner portion 160 in the forward and rearward directions. It will be appreciated that the pivoting open of the panel portions 141, 143 may also be supported or assisted by an extendible or detachable strut portion 146, as shown in FIG. 6.

After the cargo liner portion 160 is pulled forward for maximum load carrying capacity, the panel portions 141, 143 can pivoted downwardly to lie atop the cargo liner portion 160 and supported by the upper liner edges 147 as indicated by arrow D. Finally, the ancillary panel portion 143 can be pivoted forwardly about its ancillary edge 144 as indicated by arrow E such that the ancillary portion 143 and the panel portion 141 are generally horizontally aligned. In this horizontally aligned condition, the main divider panel portion 141 and the ancillary panel portion 143 cooperatively cover and close the cargo liner portion 160 in the maximum load carrying condition. It will further be appreciated that the panel portion 141 alone can be used to cover and close the cargo liner portion 160 when the cargo liner portion 160 is pulled only partially forward.

It will be appreciated that in the maximum load carrying condition shown in FIG. 5, the cargo liner portion 160 is covered and closed by the panel portions 141, 143 such that there is no direct passage to the outside ambient surroundings formed between the cab portion 112 and the cargo box 140 when the truck 110 is reconfigured to the maximum load carrying condition. Advantageously, the sliding cargo liner portion 160 enables loose cargo loads, such as gravel, to be carried using the maximum extended cargo capacity, without damaging the interior of the cab portion 112 and without exposure to the outside elements.

It will further be appreciated that the panel portions 141, 143 in the horizontal position are sealable and latchable to the cargo liner portion 160 for security of the cab portion 112 and for sealed protection of the cab portion 112 from the outside ambient surroundings while advantageously permitting maximum cargo capacity. It will also be appreciated that in the maximum load carrying conditions, the upper surfaces 148 of the panel portions 141, 143 can also serve as a package shelf for storing additional cargo items atop the cargo liner portion 160.

Figure 8:
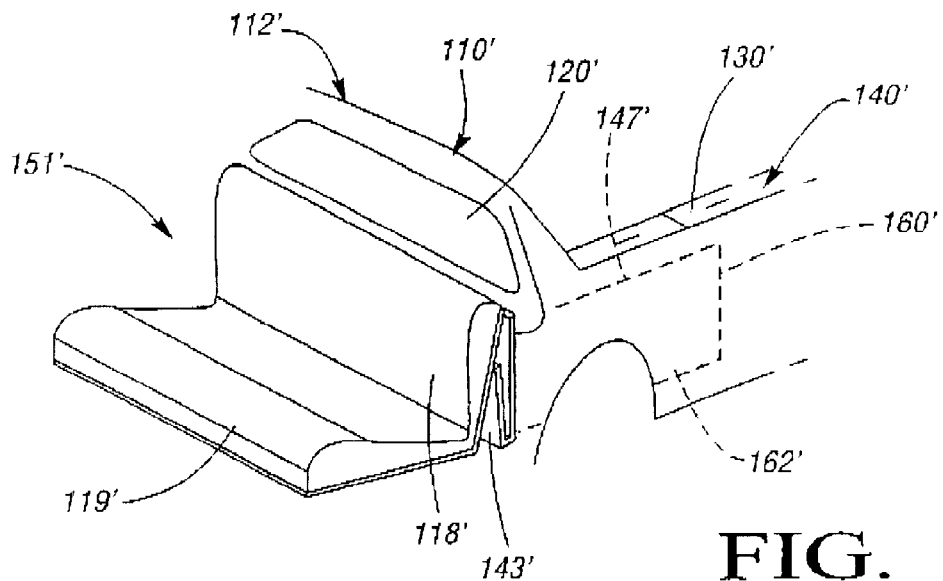
FIG. 8 is a frontal perspective view of another alternate embodiment of a pick up truck, with the truck being partially-broken-away and shown in a normal condition for carrying passengers in a rear seat of a cab portion.
Figure 9:
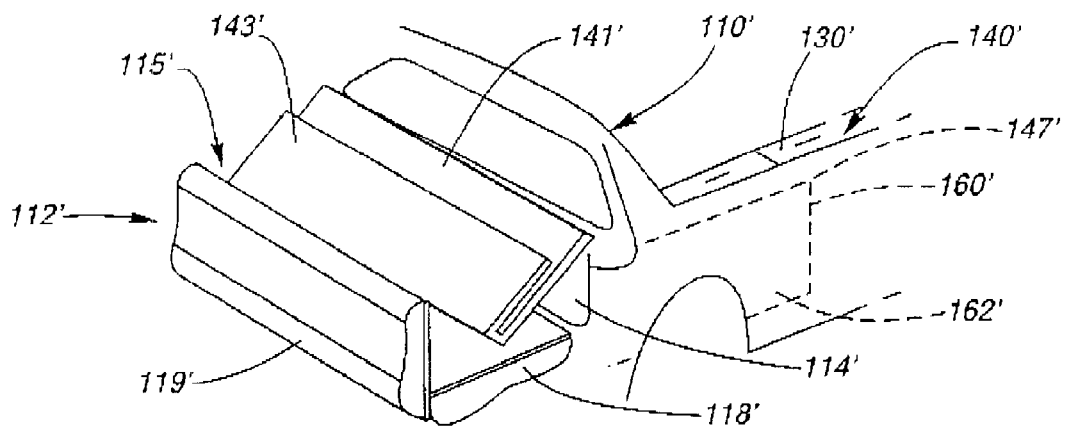
FIG. 9 is a view similar to FIG. 8, but showing the pick up truck partially reconfigured to an expanded load carrying condition.
Figure 10:
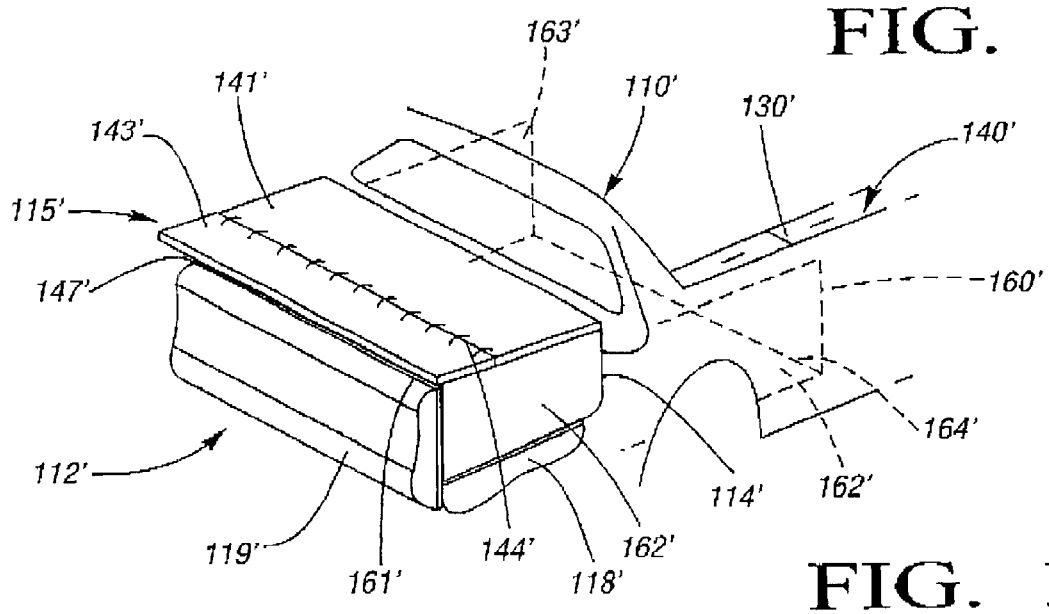
FIG. 10 is a view similar to FIG. 9, but showing the pick up truck reconfigured to an expanded load carrying condition which includes a sliding cargo liner portion closed by panel portions.

FIGS. 8–10 show yet another alternate embodiment of the invention which has a description similar to that of FIGS. 4–7 and in which similar features are denoted by similar numerals with a prime added. The main difference is that the sliding cargo liner portion 160' has a length which is shorter than the cargo box 140'. The cargo liner portion 160' has side liner walls 162', 163' having a length approximately equal to or slightly longer than the rear extended cab portion 115' of the truck 110' into which the cargo liner portion 160' is extended for maximum load carrying capacity. The shorter cargo liner 160' still allows for the same maximum cargo load capacity, but is lighter than the full length cargo liner portion 160 of FIGS. 4–7.

The embodiment of FIGS. 8–10 operates similar to that of FIGS. 4–7. The truck 110' can easily be reconfigured from the maximum passenger carrying capacity shown in FIG. 8 to the maximum cargo carrying capacity shown in FIG. 10, without the use of tools. Referring to FIGS. 8 and 9, the rear seat bottom 119' is pivoted forward and upward about its forward edge to a generally vertical position. Then, the rear seat back 118' is pivoted forward and downward about its lower edge to a generally flat horizontal. The main divider panel portion 141' together with the folded ancillary panel portion 143' may then be pivoted upward past the horizontal position (not shown). When the panel portion 141' is in the open condition, an open passage 114' is formed between the cargo box 140' and the cab portion 112'. Next, the cargo liner portion 160' can be slid forwardly into the extended rear cab portion 115' as a single unit as enabled by the panel portions 141', 143' being pivoted upward above the sliding cargo liner portion 160'. It will be appreciated that the front and side liner walls 161', 162', 163' and the liner floor portion 164' move as a single unit. Preferably, the cargo liner portion 160' is light enough such that it may be pulled or pushed manually forward, such as by handles (not shown). Preferably in this embodiment, the side liner walls 162', 163' and the liner floor portion 164' have a length that is only slightly longer than the extended rear cab portion 115', such that the cargo liner portion 160' is as light as possible for easy manual movement. However, it will also be appreciated that power operation could be provided to move the cargo liner portion 160' in the forward and rearward directions.

After the cargo liner portion 160' is pulled forward for maximum load carrying capacity, the panel portions 141', 143' can be pivoted downwardly to lie atop the cargo liner portion 160' and supported by the upper liner edges 147' and the ancillary panel portion 143' can be pivoted forwardly about its ancillary edge 144' such that the ancillary portion 143' and the panel portion 141' are generally horizontally aligned. In this horizontally aligned condition shown in FIG. 10, the main divider panel portion 141' and the ancillary panel portion 143' cooperatively cover and close the cargo liner portion 160' in the maximum load carrying condition. It will further be appreciated that the panel portion 141' alone can be used to cover and close the cargo liner portion 160' when the cargo liner portion 160' is pulled only partially forward.

It will be appreciated that in the maximum load carrying condition shown in FIG. 10, the cargo liner portion 160' is covered and closed by the panel portions 141', 143' such that there is no direct passage to the outside ambient surroundings formed between the cab portion 112' and the cargo box 140' when the truck 110' is reconfigured to the maximum load carrying condition. Advantageously, the sliding cargo liner portion 160' enables loose cargo loads, such as gravel, to be carried using the maximum extended cargo capacity, without damaging the interior of the cab portion 112' and without exposure to the outside elements.

It will further be appreciated that the panel portions 141', 143' in the horizontal position are sealable and latchable to the cargo liner portion 160' for security of the cab portion 112' and for sealed protection of the cab portion 112' from the outside ambient surroundings while advantageously permitting maximum cargo capacity. It will also be appreciated that smaller cargo items can be securely stored in the side storage compartments 130', in a manner similar to that of FIGS. 4–7.

FIGS. 11–15 show still another alternate embodiment of the configuration shown in FIGS. 8–10 with features having a similar description denoted by similar reference numerals. However, FIGS. 11–15 show some additional latching and sealing configurations, as will now be described.

Figure 11:
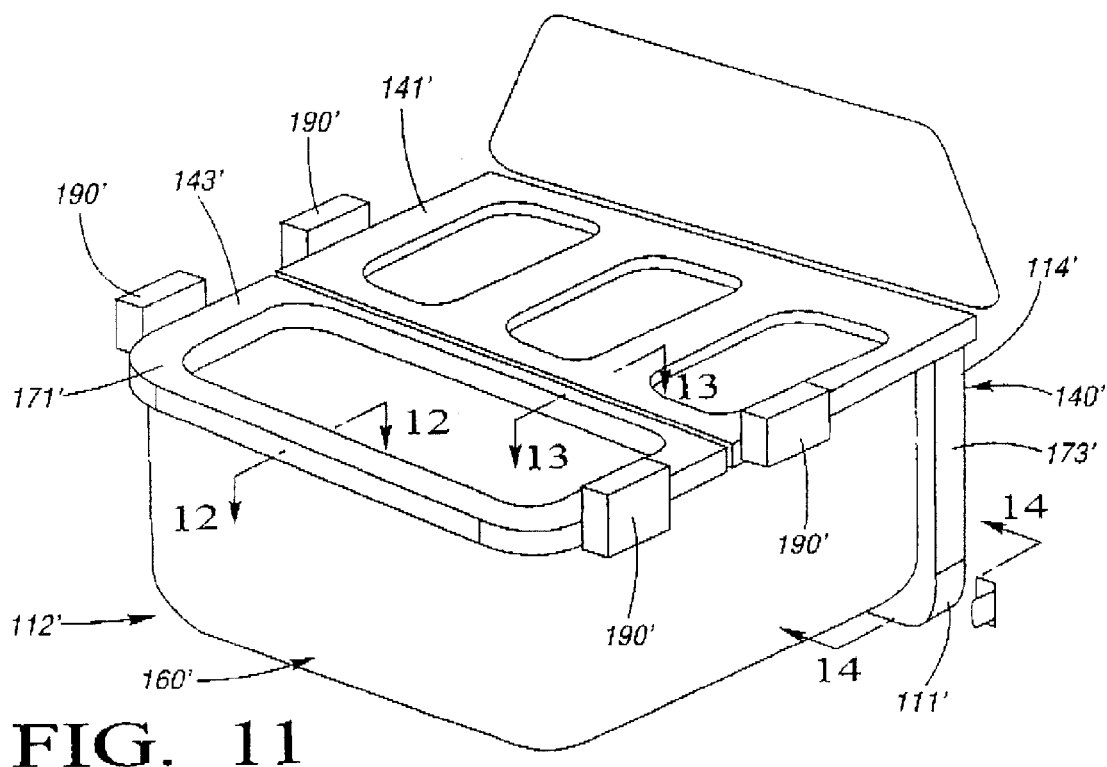
FIG. 11 is a view similar to FIG. 9, but showing a sealing and latching configuration for the panel portions.
Figure 12:
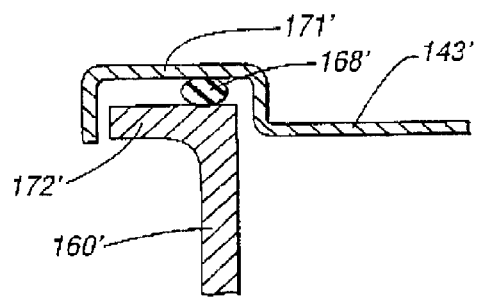
FIG. 12 is a sectional view taken along line 12—12 of FIG. 11.
Figure 13:
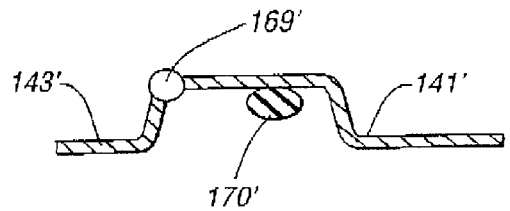
FIG. 13 is a sectional view taken along line 13—13 of FIG. 11.

In the maximum load carrying condition shown in FIG. 11, the panel portions 141', 143' are in a generally horizontal condition for closing the cargo liner portion 160'. As shown in FIG. 12, the panel portions 141', 143' include a downwardly turned U-shaped flange portion 171' which is shaped for overlying a liner flange portion 172' on the cargo liner portion 160'. A first seal 168' is preferably carried along the outer edges of with the cargo liner portion 160' with the flange portion 171' for sealing the panel portions 141', 143' to the cargo liner portion 160'. It will be appreciated that the first seal 168' may alternately be carried by the liner flange portion 172' of the panel portions 141', 143'. FIG. 13 shows a section through the panel portion 141' and the ancillary panel portion 143' which may suitably be provided with a hinge pivot portion 169' and a second seal 170'. The seals 168' and 170' cooperatively provide sealing between the folded panel portions 141', 143' to prevent outside ambient surroundings and dirt from the cargo box 140' from passing into the cab portion 112' in the maximum passenger configuration.

Figure 14:
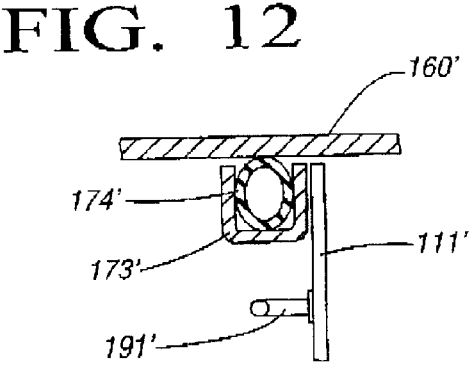
FIG. 14 is a sectional view taken along line 14—14 of FIG. 11 with the sliding liner portion in the forward position as shown in FIG. 11.

FIG. 14 shows a sectional view taken along line 14—14 of FIG. 11 and illustrates a latching and sealing arrangement with the truck body 111' at the passage 114'. The truck body 111' preferably includes a vertically extending structural channel 173' that carries a third seal 174' therein. When the cargo liner portion 160' is slid to a forward position, the third seal 174' provides a seal between the cab portion 112' and the cargo box 160' such that the cab portion 112' is protected from the outside ambient conditions. The truck body 111' also carries one or more strikers 191' that are used to latch the panel portions 141', 143' in the closed condition, as will now be described.

Figure 15:
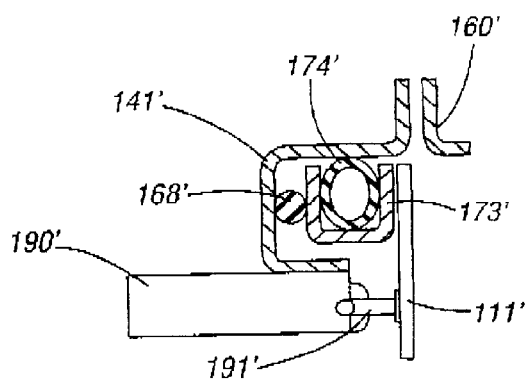
FIG. 15 is a sectional view also taken generally along line 14—14 of FIG. 11, but showing the sealing and latching configuration when the sliding liner portion in a rearward condition and when the panel portion is in a generally vertical, latched condition.

FIG. 15 shows one possible arrangement for latching the panel portions 141', 143' to the truck body 111'. As shown in FIG. 11, the panel portions 141', 143' each carry one or more latch portions 190'. It will be appreciated that when the cargo liner portion 160' is slid to the rearward position and the panel portions 141', 143' are in the folded, closed condition (for example, as shown in FIG. 8), the latch portions 190' are aligned for attachment to the strikers 191', as shown in FIG. 15. It will also be appreciated that the first seal 168' is also useful for sealing the panel portions 141', 143' to the truck body 111' at the structural channel 173' to protect the cab portion 112' from the outside ambient surroundings.

Figure 16:
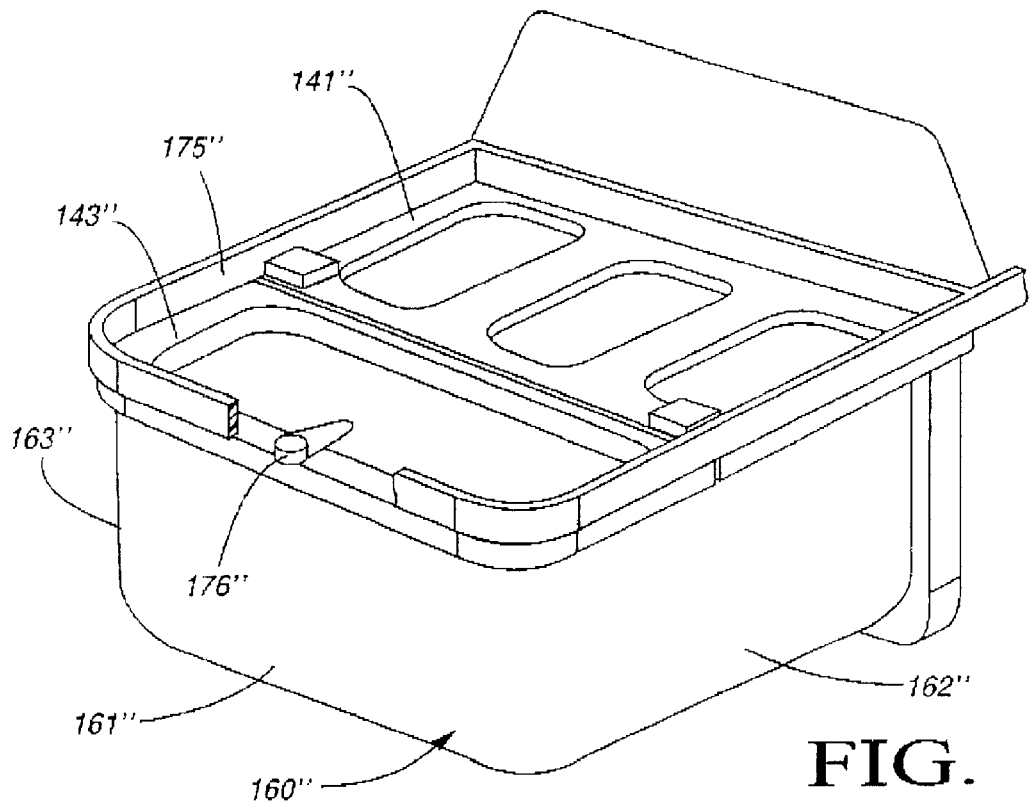
FIG. 16 shows an alternate latching and sealing configuration to the embodiment shown in FIG. 11, and including an upstanding flange portion.

FIG. 16 shows yet another alternate arrangement of the pick up configuration of FIGS. 8–15. The elements having similar descriptions are denoted by same reference numeral plus a double prime.

In the maximum load carrying condition shown in FIG. 16, the panel portions 141", 143" are in a generally horizontal condition for closing the cargo liner portion 160". The cargo liner portion 160" preferably includes an upwardly extending flange portion 175" along the upper outer edges of the front liner wall 161", and the side liner walls 162", 16". The panel portions 141', 143' in the closed condition are seated within the flange portion 175". A suitable seal (not shown) may preferably carried along the outer edges of with the panel portions 141", 143" for sealing the panel portions 141", 143" to the cargo liner portion 160". It will be appreciated that the seal may alternately be carried by the cargo liner portion 160". Advantageously, the flange portion 175" also can be used to keep cargo in place which is carried atop the cargo liner portion 160" on the package shelf cooperatively formed by the upper surfaces of the panel portions 141", 143". In addition, a suitable lock mechanism 176" may be provided for locking the panel portions 141", 143" to the cargo liner portion 160".

Figure 17:
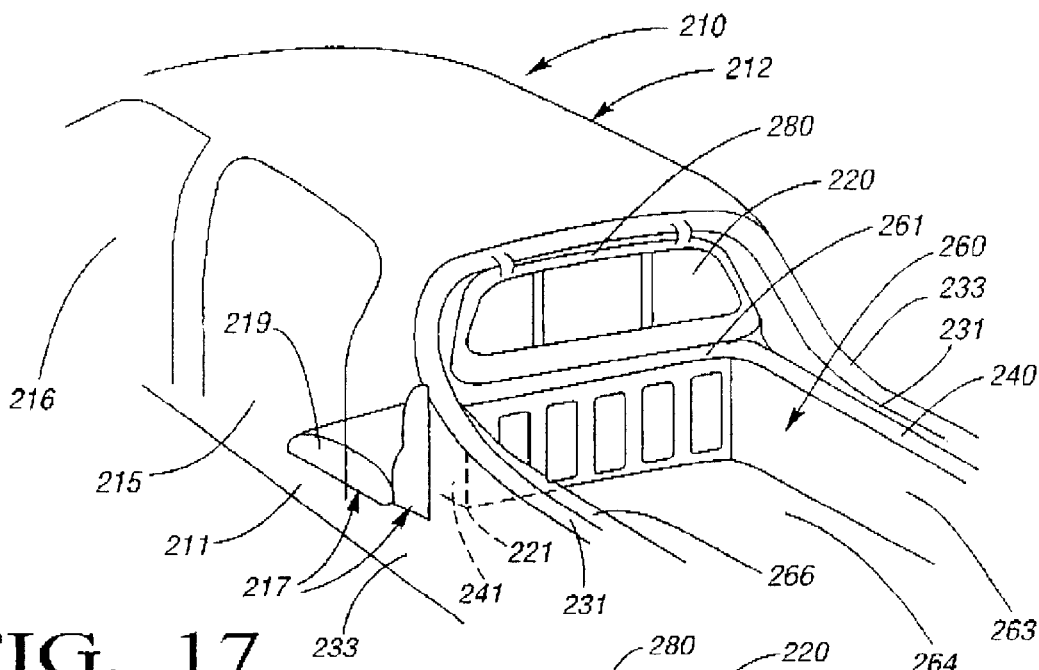
FIG. 17 is a rear perspective view of yet another alternate embodiment of a pick up truck, with the truck being partially-broken-away and shown in a normal condition for carrying passengers in a rear seat of a cab portion.
Figure 18:
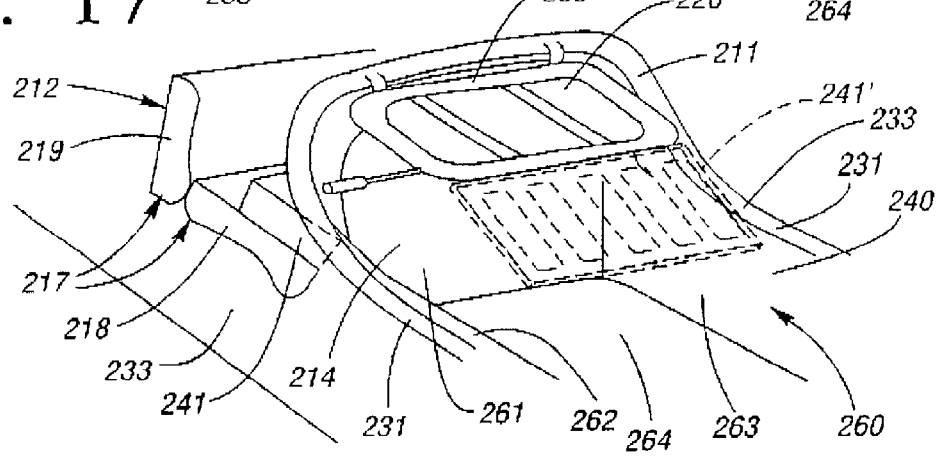
FIG. 18 is a view similar to FIG. 17, but showing the pick up truck partially reconfigured to an expanded load carrying condition with the rear window pivoted in a rearward direction.
Figure 19:
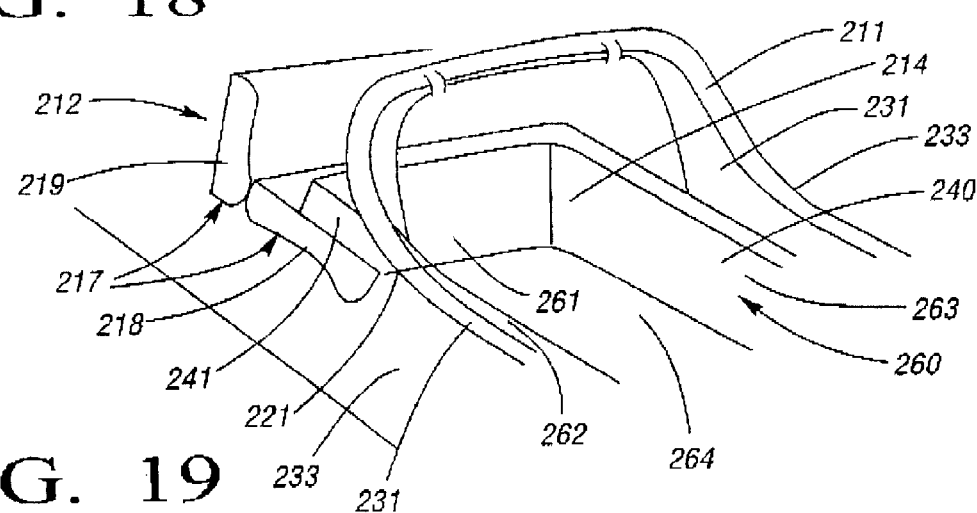
FIG. 19 is a view similar to FIG. 18, but showing the rear window removed for increased vertical load carrying capacity.

FIGS. 17–19 show still a further alternate embodiment of the pick up truck configuration. A vehicle being a pick up truck 210 includes a cab portion 212 for normally carrying passengers and a cargo box 240 for carrying various types of cargo loads (not shown), for example such as wooden boards each having a length of six to ten feet or a multitude of other cargo loads. As best shown in FIG. 17, the truck 210 includes a front passenger seating area, generally indicated at 216, having one or more front seats for seating one to three passengers. As is becoming increasingly popular, the cab portion 212 also includes a rear extended cab portion 215 which preferably includes a rear seat 217 for seating an additional one to three passengers. The truck 210 includes features making it easily adaptable for carrying longer and also taller loads without lengthening the cargo box 240 for ease of parking and maneuvering, while also permitting the increased passenger capacity, as described further hereinafter.

The cargo box 240 generally includes four sides comprising a front divider panel portion 241, first and second side walls 231 preferably located inboard of the wheel covers 239, and a rear wall (not shown) mainly provided by a tailgate. The truck 210 may also be provided with suitable side storage compartments (not shown) on opposite sides of the cargo box 240 located in the space between the inner walls 231 and the outer body sheet metal 233.

Referring to FIG. 17, the rear extended cab portion 215 includes the rear seat 217, which is preferably shown as a single bench seat, but may also be one or more separate seats. The rear seat 217 includes an upper seat back 218 which is pivotally mounted at its lower edge and a seat bottom 219 which is pivotally mounted at its forward edge. The rear seat 217 is normally configured for seating one to three passengers in the rear seat 217 for maximum passenger carrying capacity. The rear seat 217 may also be reconfigured for maximum cargo load capacity, as described further hereinafter and as shown in FIGS. 18 and 19.

As shown in FIG. 17, the divider panel portion 241 is normally oriented in a generally vertical position and preferably provides a single structural dividing wall between the cargo box 240 and the cab portion 212 and simultaneously serves as the front wall of the cargo box 240 and the rear wall of the cab portion 212. The panel portion 241 normally separates and closes the cab portion 212 and its passengers from the ambient surroundings outside. The panel portion 241 is hinged to the truck body 211 for pivoting about a lower panel edge 221 from a generally vertical closed condition shown in FIG. 17 to a generally horizontal open condition as shown in FIGS. 18 and 19. The panel portion 241 may be made of any suitable sturdy material, such as metal or composites and preferably is sealed to the body 211 of the truck 210 around its outer panel edges when in the generally vertical closed condition.

A glass rear window 220 is normally positioned above the panel portion 241 and vertically aligned therewith for further closing the cab portion 212 from the outside surroundings. As best shown in FIG. 28, the rear window 220 is hinged about its upper window edge 280 and can advantageously be pivoted upward and rearward to an open condition which allows for a taller cargo load to be carried. Also advantageously as shown in FIG. 19, the rear window 220 can be completely removed when the pick up truck 210 is reconfigured to the maximum load carrying condition, as will now be described.

The truck 210 also includes the cargo liner portion 260 which preferably includes a front liner wall 261 and opposite side liner walls 262, 263 which are connected by a liner floor portion 264. The liner portion 260 is preferably made of a light, yet sturdy material, such as a lightweight metal, plastics, or composites. The liner portion 260 is slidably mounted onto the cargo box 240 at the inner walls 231 of the storage compartments. The liner portion 260 may be slidably mounted to the cargo box 240 in any suitable manner. For example, the cargo box 240 may include an integrally molded channel portion (not shown) extending along the length of the inner walls 231 and the liner portion 260 may include a T-shaped guide rail (not shown) on the outer surfaces of the side liner walls 262, 263 on which the cargo liner portion 260 slides back and forth within the channel portions. It will also be appreciated that numerous other sliding configurations are possible, such as exchanging the guide rail and the channel portion, or including rollers or chains or cables.

The truck 210 can easily be reconfigured from the maximum passenger carrying capacity shown in FIG. 17 to the maximum cargo carrying capacity shown in FIGS. 18 and 19, without the use of tools. Referring to FIG. 18, the rear window 220 is preferably pivoted upwardly and rearwardly to a generally horizontal open position. The rear seat bottom 219 is pivoted forward and upward about its forward edge to a generally vertical position. Then, the rear seat back 218 is pivoted forward and downward about its lower edge to a generally flat horizontal condition as shown in FIGS. 18 and 19. The divider panel portion 241 may then be pivoted forward and downward to the generally horizontal open condition. When the panel portion 241 is in the open condition, an open passage 214 is formed between the cargo box 240 and the cab portion 122. Next, the cargo liner portion 260 can be slid forwardly into the extended rear cab portion 215 as a single unit. It will be appreciated that the front and side liner walls 261, 262, 263 and the liner floor portion 264 moves as a single unit. Preferably, the cargo liner portion 260 is light enough such that it may be pulled or pushed manually forward, such as by handles (not shown). However, it will also be appreciated that power operation could be provided to move the cargo liner portion 260 in the forward and rearward directions. Finally, if desired when carrying tall cargo loads, the rear window 220 may be completely removed from the vehicle.

It will be appreciated that in the maximum load carrying condition shown in FIGS. 18 and 19, the cargo liner portion 260 is not covered and a direct air passage is formed between the cab portion 212 and the cargo box 240, such that the cab portion 212 is partially open to the ambient outside surroundings when the truck 210 is reconfigured to the maximum load carrying condition. Advantageously, the sliding cargo liner portion 260 enables loose cargo loads, such as gravel, to be carried using the maximum extended cargo capacity, without damaging the interior of the cab portion 212.

It will be understood that a person skilled in the art may make modifications to the embodiment shown in FIGS. 17–19. For example, although the panel portion 241 preferably pivots forward and downward for storage atop the rear seat back 218 in the maximum cargo configuration, it will also be appreciated that the panel portion 241 could alternately pivot upward and forward and include an ancillary panel portion for covering the cargo liner portion 260, similar to the arrangement shown in FIGS. 5–7. With reference to FIG. 18, it will further be appreciated that the panel portion as indicated at 241' could alternately be connected to the rear window 220, and be lifted and removed with the rear window 220. Although the truck 210 is shown as including a divider panel portion 241 that is separate from the cargo liner portion 260, it will be appreciated that the panel portion 241 could be eliminated and the front liner wall 261 will also serve as the divider panel portion 241. In this case, the front liner wall 261 simply moves with the cargo liner portion 260 to the maximum cargo condition, thus eliminating any manipulation of a separate panel portion 241.

Figure 20:
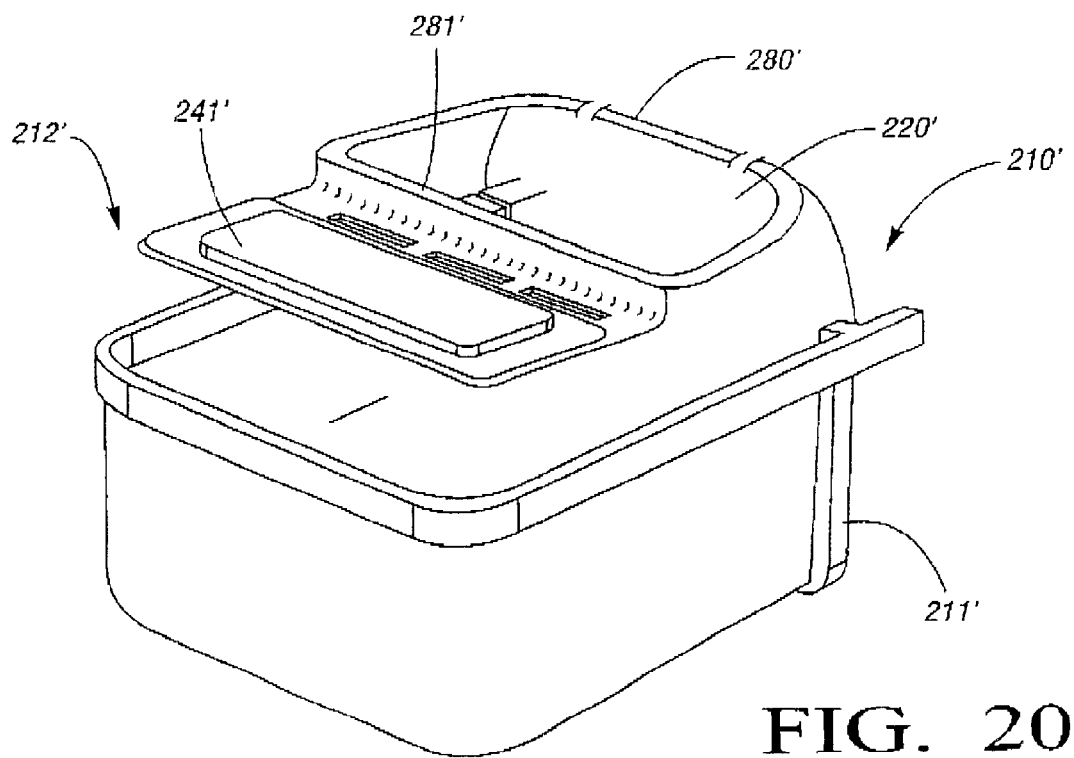
FIG. 20 is a frontal perspective view of yet a further alternate embodiment of the pick up truck with the rear window and the panel portion pivoted forwardly into the cab portion of the truck.

FIG. 20 shows yet another embodiment of the arrangement of FIGS. 17–19, with similar features denoted by similar numerals, plus a prime. The main difference in the embodiment of FIG. 20 is that the upper window edge 280' of the rear window 220' is hingedly connected to the truck body 211' for pivotal movement upward and forward into the cab portion 212' to the open condition. In addition, the panel portion 241' is preferably connected to the lower window edge 281' of the rear window 220' and preferably contains suitable latching features for securing the panel portion 241' and the rear window 220' to the roof of the truck 210' for storage when the truck 210' is reconfigured to the maximum load carrying condition.

Yet another alternate embodiment of the invention is shown in FIGS. 21–23 and includes a pick up configuration in which the cargo capacity is extended in a rearward direction, instead of the forward direction in the prior embodiments. Referring to FIG. 21, a vehicle being a pick up truck 310 includes a cab portion 312 for normally carrying passengers and a cargo box 340 for carrying various types of cargo loads (not shown), for example such as wooden boards each having a length of six to ten feet or a multitude of other cargo loads. The truck 310 includes features making it easily adaptable for carrying longer loads by lengthening the cargo box 340, as described further hereinafter.

The cargo box 340 generally includes four sides comprising a front panel portion 341, first and second side inner walls 331 and a rear wall 353 mainly provided by a tailgate 354. The tailgate 354 is pivotally mounted at a lower tailgate edge 355 for movement between a generally horizontal open condition shown in FIG. 21 and a generally vertical closed condition. The tailgate 354 also includes an upper tailgate edge 356. The cargo box 340 includes a lower floor portion 337 extending between the front panel portion 341, side inner walls 331, and rear wall 353. The cargo box 340 further includes upwardly extending wheel covers (not shown) which protrude into the cargo box 340 and decrease the width of the cargo box 340 at the floor portion 337.

As shown in FIG. 21, the divider panel portion 341 is normally oriented in a generally vertical position and preferably provides a single structural dividing wall between the cargo box 340 and the cab portion 312 and simultaneously serves as the front wall of the cargo box 340 and the rear wall of the cab portion 312. The panel portion 341 normally separates and closes the cab portion 312 and its passengers from the ambient surroundings outside. The panel portion 341 may be made of any suitable sturdy material, such as metal or composites and preferably is sealed to the body 311 of the truck 310.

The cargo box 340 includes side storage compartments 330 located on each side of the cargo box 340. The side storage compartments 330 each include one of the inner walls 331 which preferably covers the wheel covers and also an outer wall 332 which preferably is provided by the outer body sheet metal 333. The side storage compartments 330 also each preferably include hinged cover doors 329 which preferably may be latched and locked for secure storage of smaller cargo items. Although the side storage compartments 330 are shown as top opening, it will be appreciated that many other configurations are possible, including inner and outer openings. Advantageously, the side storage compartments 330 eliminates the empty area between the main cargo box 340 and the sliding cargo liner portion 360 to prevent dirt and moisture from settling in the empty area, if left open.

The truck 310 also includes the cargo liner portion 360 which preferably includes a rear liner wall 361 and opposite side liner walls 362, 363 which are connected by a liner floor portion 364. The rear liner wall 361 preferably has a lower liner wall edge 382 which is hingedly connected to the liner floor portion 364. The liner portion 360 is preferably made of a light, yet sturdy material, such as a lightweight metal, plastics, or composites. The liner portion 360 preferably does not include a front wall, since the panel portion 341 of the cargo box 340 normally serves as the front wall of the cargo liner portion 360 and cargo box 340. The liner portion 360 is slidably mounted onto the cargo box 340 at the inner walls 331 of the storage compartments. The liner portion 360 may be slidably mounted to the cargo box 340 in any suitable manner. For example as shown in FIG. 22, the cargo box 340 may include an integrally molded channel portion 365 extending along the length of the inner walls 331 of the side storage compartments 330 and the liner portion 360 may include a T-shaped guide rail 366 on the outer surfaces of the side liner walls 362, 363 on which the cargo liner portion 360 slides back and forth within the channel portions 365. It will also be appreciated that numerous other sliding configurations are possible, such as exchanging the guide rail 366 and the channel portion 365, or including rollers or chains or cables.

As shown in FIG. 21, the truck 310 can easily be reconfigured to the maximum cargo carrying capacity, without the use of tools. The tailgate 354 is simply pivoted rearward and downward to a generally horizontal, open condition. Next, the cargo liner portion 360 can be slid rearwardly out over the open tailgate 354 as a single unit. It will be appreciated that the rear and side inner liner walls 361, 362, 363 and the liner floor portion 364 move as a single unit. Preferably, the cargo liner portion 360 is light enough such that it may be pulled or pushed manually, such as by handles (not shown). It will also be appreciated that the rear liner wall 361 may be pivoted downwardly and rearward for carrying cargo loads longer the length of the liner portion 360 in the extended load carrying condition. It will further be appreciated that the rear liner wall 361 may be stationed in a generally vertical closed condition for carrying extended loads, including loose loads, such as gravel.

It will be appreciated that in the maximum load carrying condition shown in FIG. 21, that the cargo load is not covered, unless by covering device being separate from the cargo liner 360. However, FIG. 23 shows an alternate configuration using the same components with the same reference numerals as shown in FIGS. 21 and 22. The cargo liner portion 360 may be removed from the cargo box 340 and flipped upside down and be slide back into the cargo box 340 to cover the cargo load. In this configuration, the cargo liner 360 also alternately serves as a tonneau cover.

Although the configuration as shown in FIG. 21 does not provide a passage into the passenger compartments, it will also be appreciated that this configuration may be modified to include a pivoting front panel portion 341 or rear window 320 or other forward cargo extensions similar to any of the configurations shown in FIGS. 1–20 and FIGS. 24–27, yet to be described. It will further be appreciated that the cargo liner 360 of FIGS. 21–23 could also be incorporated into any of the embodiments in FIGS. 1–20 and 24–27. In some of the embodiments, it will be appreciated that it would be desirable to have a hinged front liner wall in addition to the rear liner wall 361 so that both ends of the liner portion 360 could be open or closed.

FIGS. 24–27 show still another alternate embodiment of the adaptable pick up truck configuration in which the cab portion 412 is advantageously protected from the outside ambient surroundings in the maximum load carrying condition, and is somewhat similar to the embodiments of FIGS. 4–7 and FIGS. 8–10.

Figure 24:
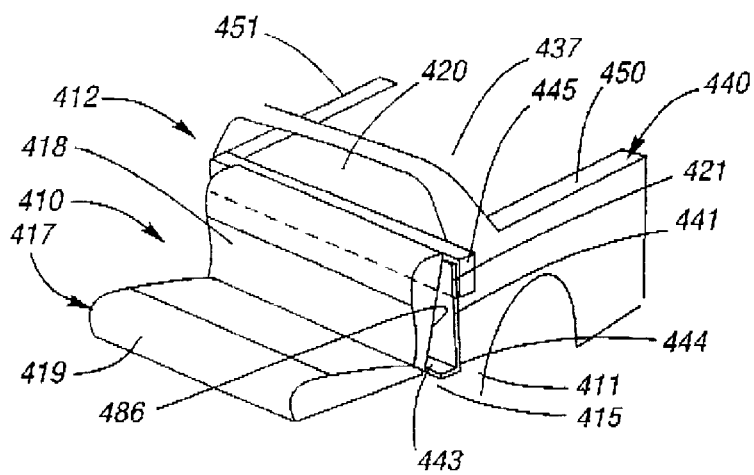
FIG. 24 is a frontal perspective view of still another alternate embodiment of a pick up truck in a normal condition for maximum passenger carrying capacity in the cab portion.

A vehicle being a pick up truck 410 includes a cab portion 412 for normally carrying passengers and a cargo box 440 for carrying various types of cargo loads, such as wood or gravel. FIG. 24 shows the truck 410 configured for carrying the maximum amount of passengers. The truck 410 includes a front passenger seating area (not shown) having one or more front seats. The cab portion 412 also includes a rear extended cab portion 415 which preferably includes a rear seat 417 for seating an additional one to three passengers. The truck 410 includes features making it easily adaptable for carrying additional cargo loads without lengthening the overall cargo box 440 for ease of parking and maneuvering, while also permitting the increased passenger capacity, as described further hereinafter.

The cargo box 440 generally includes four sides comprising a front divider panel portion 441, side walls 450, 451 and a rear wall (not shown) mainly provided by a tailgate. The cargo box 440 includes a lower floor portion 437 extending between the panel portion 441, and walls 450, 451. The cargo box 440 further includes upwardly extending wheel covers (not shown) which protrude into the cargo box 440 and decrease the width of the cargo box 440 at the floor portion 437.

Figure 25:
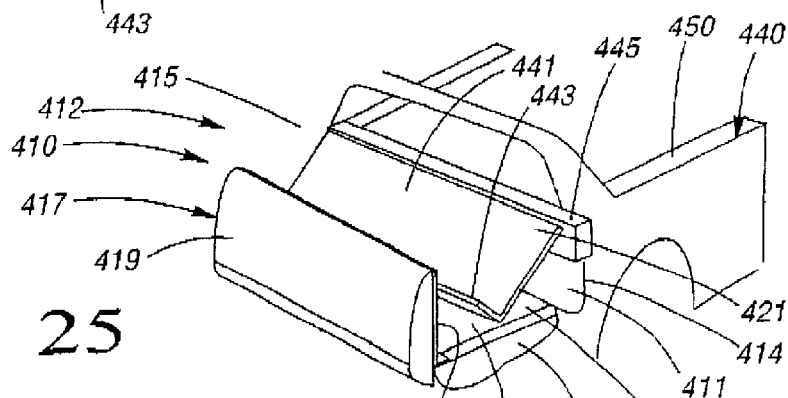
FIG. 25 is a view similar to FIG. 24, but showing the pick up partially reconfigured to an expanded load carrying condition.
Figure 27:
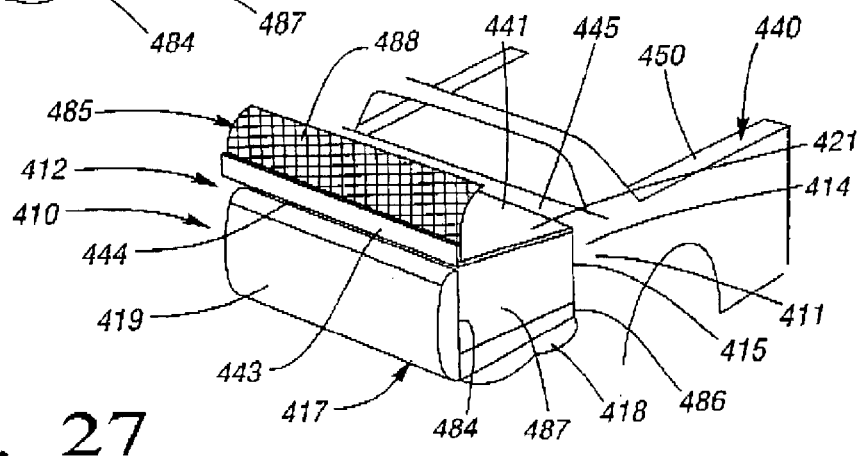
FIG. 27 is a view similar to FIG. 26, but showing the pick up reconfigured to the expanded load carrying condition and including an package shelf and cargo net.

As best shown in FIGS. 24 and 25, the rear extended cab portion 415 includes the rear seat 417, which is preferably shown as a single bench seat, but may also be one or more separate seats. As best shown in FIG. 24, the rear seat 417 includes an upper seat back 418 which is pivotally mounted at its lower edge and a seat bottom 419 which is pivotally mounted at its forward edge. The rear seat 417 may normally be configured for seating one to three passengers in the rear seat 417 for maximum passenger carrying capacity as shown in FIG. 24. The rear seat 417 may also be reconfigured for maximum cargo load capacity, as described further hereinafter and as shown in FIG. 27.

Figure 26:
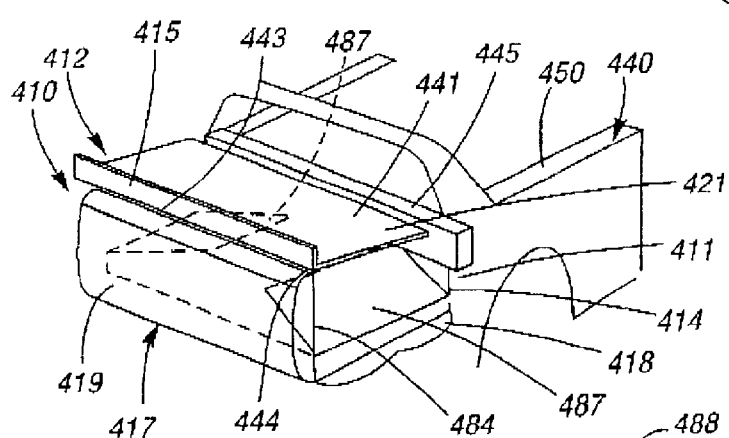
FIG. 26 is a view similar to FIG. 25, but showing the pick up further partially reconfigured to the expanded load carrying condition.

As shown in FIG. 24, the main divider panel portion 441 is normally oriented in a generally vertical position and preferably provides a single structural dividing wall between the cargo box 440 and the cab portion 412 and simultaneously serves as the front wall of the cargo box 440 and the rear wall of the cab portion 412. The panel portion 441 normally separates and closes the cab portion 412 and its passengers from the ambient surroundings outside. The panel portion 441 is hinged to the truck body 411 for pivoting about an upper panel edge 421 from a generally vertical closed condition shown in FIG. 24 to a generally horizontal open condition as shown in FIGS. 26 and 27.

As shown in FIGS. 24–27, the panel portion 441 includes a flap portion 443 which is pivotally connected to the main panel portion 441. For example, a lower flap edge 444 of the flap portion 443 is connected to the lower panel edge 421 of the main panel portion 441 and extends generally at a right angle thereto. The panel portion 441 and the flap portion 443 cooperatively provide a protective cover and package shelf when the truck 410 is reconfigured for the maximum load carrying capacity, as described further hereinafter. The panel portion 441 and flap portion 443 may be made of any suitable sturdy, lightweight material, such as metal, plastics, or composites.

A glass rear window 420 is normally positioned above the panel portion 441 and vertically aligned therewith for further closing the cab portion 412 from the outside surroundings. The rear window 420 in this configuration preferably cannot be dropped into the panel portion 441. A window support rail 445 supports the rear window 420 and divides the rear window 420 from the panel portion 441. Although not shown, it will be appreciated that the rear window 420 could be openable by having portions that slide back and forth along the window support rail 445. However, it will be appreciated that in this configuration, the rear window 420 somewhat limits the height of the maximum cargo load.

The truck 410 can easily be reconfigured from the maximum passenger carrying capacity shown in FIG. 24 to the maximum cargo carrying capacity shown in FIG. 27, without the use of tools. Referring to FIG. 25, the rear seat bottom 419 is pivoted forward and upward about its forward edge to a generally vertical position such that the seat bottom lower surface 484 provides a generally vertical forward wall of the extended cargo area, indicated generally at 485. Then, the rear seat back 418 is pivoted forward and downward about its lower edge to a generally flat horizontal condition, such that the seat back rear surface 486 provides a generally horizontal bottom wall of the extended cargo area 485. The main divider panel portion 441 together with the flap portion 443 may then be pivoted forward and upward as shown in FIG. 25. The lower panel edge 421 may then be securely attached to an upper edge of the seat bottom lower surface 484, as shown in FIG. 26. In this condition, the panel portion 441 and the flap portion 443 cooperatively provide a package shelf above the extended cargo area 485.

When the panel portion 441 is in the open condition, an open passage 414 is formed between the cargo box 440 and the cab portion 412 allowing longer cargo loads to be carried. In accordance with further aspects of the invention, a pair of side flaps 487 may be hingedly attached to opposite sides of the seat back rear surface 486. As shown in FIG. 26, the side flaps 487 may be flipped upwardly and outwardly to a generally vertical condition for attachment to the seat bottom lower surface 484 and the panel portion 441 to complete the extended cargo area 485, as shown in FIG. 27. It will be appreciated that the extended cargo area 485 is generally box-shaped and formed by the seat bottom lower surface 484, the side flaps 487, the seat back rear surface 486, and the panel portion 441. It will be appreciated that the extended cargo area 485 is preferably sealed at its joined edges to prevent the outside ambient surroundings from entering the cab portion 412.

As shown in FIG. 27, the panel portion 141 and the flap portion 143 cooperatively provide a package shelf situated above the extended cargo area 485. It will further be appreciated that a cargo net 488 could be attached to the flap portion 443 and to appropriate anchors on the truck body 411 to assist in holding light cargo items on the package shelf.

It will be understood that a person skilled in the art may make modifications to the embodiment shown in FIGS.

24–27. For example, a separate cargo liner portion similar to the one shown in FIG. 5 or FIG. 10 or FIG. 21 could also be added to the embodiment of FIGS. 24–27. In addition, side storage compartments as described above could also be added.

While the present invention has been described as carried out in a specific embodiments thereof, it is not intended to be limited thereby but is intended to cover the invention broadly.

What is claimed is:

1. An adaptable pick up truck configuration including a cab portion and a cargo box, the cab portion capable of being closed off from the cargo box, the pick up truck configuration being adaptable for carrying a cargo load longer than the cargo box, the pick up truck configuration comprising:

a pivotable panel portion, the panel portion being movable between a generally vertical position in which the cab portion is closed off from the cargo box and a generally horizontal position in which the cab portion is open to the cargo box wherein the panel portion has a lower panel edge about which the panel pivots open in a forward and downward direction into the cab portion, and a window positioned to cooperate with the panel portion in closing off the cab portion from the cargo box when in a closed condition, the window being lowerable into the panel portion when the panel portion is in the generally vertical portion to move with the panel portion in the forward and downward direction;

whereby the pick up truck configuration is adaptable to carry the cargo load longer than the cargo box through both the cab portion and the cargo box.

2. The adaptable pick up truck configuration of claim 1 wherein the cargo box includes side walls and wherein the panel portion extends substantially between the side walls.

3. The adaptable pick up truck configuration of claim 1 wherein the panel portion abuts a seat adapted to be folded downwardly into a horizontal condition to provide an upwardly facing seat back wall and wherein the panel portion at least partially overlies and is supported by the seat back when the panel portion is in the generally horizontal position.

4. The adaptable pick up truck configuration of claim 1 wherein the panel portion has an upper panel edge about which the panel portion pivots rearward and upward to the generally horizontal position for providing the opening.

5. The adaptable pick up truck configuration of claim 1 wherein the cargo box includes opposing channels that guide a sliding cargo liner.

6. The adaptable pick up truck configuration of claim 1 wherein the cab portion includes a seat adapted to be folded downwardly to a horizontal position to provide an upwardly facing seat load surface and wherein the seat load surface is generally vertically aligned with the panel portion when the panel portion is in the generally horizontal position such that the panel portion and the seat load surface are adapted to cooperatively support the cargo load in a generally horizontal condition.

7. An adaptable pick up truck configuration including a cab portion and a cargo box, the cargo box having a front liner wall adjacent the cab portion and a rear wall, the pick up truck configuration being adaptable for carrying a cargo load longer than the cargo box, the pick up truck configuration comprising;

the rear wall of the cargo box including a tailgate pivotally connected to the cargo box for movement between a generally upright closed position and a generally horizontal open position, the front liner wall of the cargo box being oriented in a generally vertical position and being movable into the cab portion while remaining in the generally vertical position extending a cargo length carrying capability of the cargo box.

8. The adaptable pick up truck configuration of claim 7 wherein the cargo box includes at least one pair of opposing channels that guide a cargo liner wherein sliding the cargo liner effects movement of the front liner wall.

9. An adaptable pick up truck configuration including a cab portion and a cargo box comprising:

a front passenger seating area in the cab portion;

rear seat in the cab portion behind the front passenger seating area, the rear seat being movable between a maximum passenger carrying capacity position with the cab portion, and a maximum cargo carrying capacity position within the cab portion;

divider panel portion positioned behind the rear seat in a generally vertical orientation when the rear seat is in the maximum passengers carrying capacity position, wherein the divider panel portion in combination with a window positioned above the divider panel portion providing the sole means of separating the cab portion from the cargo box, the divider panel portion being repositionable only after the rear seat is independently moved to the maximum cargo carrying capacity position.

10. An adaptable pick up truck configuration according to claim 9 wherein the window is lowerable into the diver panel portion.

11. An adaptable pick up truck configuration according to claim 9 wherein the divider panel portion pivots downwardly into the cab portion when repositioned, serving as part of a load floor for the cargo box.

12. An adaptable pick up truck configuration according to claim 9 wherein the divider panel portion pivots upwardly into the cab portion to a generally horizontal condition providing a protective cover within the cab portion when repositioned.

13. An adaptable pick up truck configuration according to claim 12 wherein the cargo box includes a slidable cargo liner that is extendable into the cab portion and under the divider panel portion after pivoting the divider panel portion upwardly.

14. An adaptable pick up truck comprising:

a cab portion having a rear seat that is positionable in a passenger carrying position, the rear seat being repositionable to maximize cargo carrying capacity of the pick up truck;

a cargo box portion generally positioned behind the cab portion and including a tailgate;

a divider panel portion positionable in a generally vertical orientation in combination with a window positionable in a generally vertical orientation above the divider panel portion providing the sole means of separating and closing the cab portion from the cargo box portion, the divider panel portion being pivotable into the cab portion only after the rear seat is repositioned to maximize the cargo carrying capacity of the pickup truck,,so that a cargo load longer than the cargo box portion is positionable in the cargo box and cab portion without opening the tailgate.

15. An adaptable pick up truck according to claim 14 wherein the window is lowerable into the divider panel portion.

16. An adaptable pick up truck according to claim 14 wherein the divider panel portion pivots upwardly into the cab portion to a generally horizontal condition.

17. An adaptable pick up truck according to claim 14 wherein the cargo box includes a slidable cargo liner that is extendable into the cab portion after the divider panel portion is pivoted into the cab portion.

18. An adaptable pick up truck comprising:

a body including a cab portion and a cargo box;

a divider panel portion orientable in a generally vertical position providing a single structural dividing wall between the cargo box and the cab portion simultaneously serving as a front wall of the cargo box and as a rear wall of the cab portion, the divider panel portion hinged to the body for pivoting from the generally vertical position to a generally horizontal open position, the divider panel portion sealed to the body when in generally vertical position; and a window positionable above the divider panel portion and aligned therewith for further closing the cab portion.

19. An adaptable pick up truck according to claim 18 wherein the window is lowerable completely into the divider panel portion while in the generally vertical position and the divider panel portion is pivotable to the generally horizontal open position while containing the window.

* * * * *